United States Patent [19]
Higashikata et al.

[11] Patent Number: 6,005,471
[45] Date of Patent: Dec. 21, 1999

[54] THERMAL PROTECTOR FOR ELECTRIC MOTORS

[75] Inventors: Isao Higashikata, Owariasahi; Takeo Sakakibara, Handa; Hideki Koseki, Niwa-gun, all of Japan

[73] Assignee: Ubukata Industries Co., Ltd., Nagoya, Japan

[21] Appl. No.: 08/886,546

[22] Filed: Jul. 1, 1997

[30] Foreign Application Priority Data

Jul. 4, 1996 [JP] Japan ..................................... 8-195634
Oct. 17, 1996 [JP] Japan ..................................... 8-297543
Mar. 28, 1997 [JP] Japan ..................................... 994846

[51] Int. Cl.$^6$ .......................... H01H 37/12; H01H 37/04; H01H 37/46
[52] U.S. Cl. .......................... 337/347; 337/360; 337/380; 337/368
[58] Field of Search ..................................... 337/333, 343, 337/347, 360, 362, 365, 368, 380

[56] References Cited

U.S. PATENT DOCUMENTS

| | | | |
|---|---|---|---|
| 4,167,721 | 9/1979 | Senor et al. | 337/112 |
| 4,517,541 | 5/1985 | Ubukata et al. | 337/89 |
| 4,620,175 | 10/1986 | Karr et al. | 337/343 |
| 4,843,363 | 6/1989 | Ubukata et al. | 337/94 |
| 4,866,408 | 9/1989 | Petraitis et al. | 337/104 |
| 5,015,985 | 5/1991 | Ubukata et al. | 337/368 |
| 5,121,095 | 6/1992 | Ubukata et al. | 337/365 |
| 5,212,465 | 5/1993 | Mizutani et al. | 337/368 |

Primary Examiner—Leo P. Picard
Assistant Examiner—Anatoly Vortman
Attorney, Agent, or Firm—Foley & Lardner

[57] ABSTRACT

A thermal protector includes a header plate and a metal housing having an open end hermetically welded to an peripheral edge of the header plate. The housing is formed into a generally slender shape so as to be suited for mounting on end turns of a stator winding of a three-phase electric motor. A thermally responsive element includes a shallow curved portion at which the element changes states of curvature with snap action in response to different ambient temperatures. The thermally responsive element has two movable contacts secured to it to be disposed symmetrically about a center of the curved portion so that the movable contacts are engageable with and disengageable from fixed contacts respectively. A push piece is disposed in the housing to exert a pushing force on a normally convex side of the thermally responsive element. The pushing force is adjusted by deforming the outer surface portion of the housing for calibration of the operating temperature. The push piece includes a portion secured to an inner surface of the housing so as to correspond substantially to the deformed outer surface portion of the housing for calibration of the operating temperature.

22 Claims, 15 Drawing Sheets

THERMAL PROTECTOR FOR ELECTRIC MOTORS

BACKGROUND OF THE INVENTION

1. Field of the Invention

This invention relates to an internal thermal protector for electric motors used in hermetic electrically-driven compressors, and more particularly to such an internal thermal protector for protecting three-phase motors against burnout.

2. Description of the Prior Art

As conventional thermal protectors of the above-described type, Japanese Patent Publication No. 56-130040A discloses a thermally responsive switch and Japanese Patent Publication No. 62-88232A discloses a thermally responsive snap action switch. These disclosed protectors are mounted on single-phase motors and comprise a thermally responsive element such as a bimetal having a central dish-shaped or otherwise, curved portion formed by drawing. The thermally responsive element has one end carrying a movable contact engaged with and disengaged from a fixed contact and the other end secured to an elastic plate. In determination of a contact pressure between the movable and fixed contacts and an operating temperature of the protector, both ends of the thermally responsive element are abutted against the fixed contact and a support respectively in an inoperative condition of the protector. In this state, a predetermined ressure is applied to a central convex portion of the thermally responsive element, so that the contact pressure and the operating temperature are determined. In these protectors, the thermally responsive element and parts around the element heat up when a current flows between terminals. The thermally responsive element changes its state of curvature with snap action when an ambient temperature is increased because of an abnormal condition of the motor or when the motor is in an overheat condition due to an overcurrent. Consequently, the movable contact secured to the one end of the thermally responsive element is disengaged from the fixed contact, thereby cutting off a current path.

Japanese Patent Publication Nos. 57-34623A, 1-105435A and 6-96649A disclose thermal protectors for a three-phase motor respectively. Each of these protectors comprises a generally circular thermally responsive element having a central dish-shaped or otherwise, curved portion formed by drawing. Two movable contacts and an elastic member are secured to the thermally responsive element so that points of securement form an imaginary substantially equilateral triangle. In determination of the contact pressure and the operating temperature of the protector, the movable contacts and the elastic member are abutted against fixed contacts and a support respectively. In this state, a predetermined pressure is applied to a central portion of the thermally responsive element which is convex at an ordinary temperature, so that the contact pressure and the operating temperature are determined. These three-phase motor protectors are connected to a neutral point of windings of a three-phase motor arranged in a wye configuration. Upon occurrence of an abnormal condition of the motor, the thermally responsive element changes its state of curvature in the same manner as described above about the thermal protectors for the single-phase motors, thereby opening the neutral point to cut off interphase current paths.

In the thermal protectors for the three-phase motors, the current is caused to flow through the thermally responsive element so that heat generated by the thermally responsive element is primarily used to operate the same. The two movable contacts and the elastic member are secured to the generally circular thermally responsive element so that points of securement form an imaginary substantially equilateral triangle. The three-phase thermal protectors are formed into a relatively flat configuration and has approximately equal longitudinal and lateral dimensions.

In each of the above-described motor protectors, the thermally responsive element carries the movable contact on the free end thereof and has the other end connected to the elastic plate and serving as a supported end, so that an excessive amount of stress is prevented from concentrating on the supported end. The elastic plate also serves as a heating element for compensating the heat generated by the thermally responsive element. However, in the case where the motor has a large rated current or where an operating temperature of the thermally responsive element is set at a large value, the elastic plate causes an annealing effect when serving as the heating element with its temperature being increased. Consequently, the performance of the elastic plate as an elastic member is reduced. Thus, the elastic plate cannot be used in the thermal protector when it is used for the motors of the high output type. A rigid heating element would be considered to be used instead of the elastic plate for the solution of the above-described problem. In this case, however, there is the possibility that an excessive stress may concentrate on the supported end of the thermally responsive element, resulting in variations in the operating temperature thereof. This entails a problem.

The elastic plate can be twisted even when the thermally responsive element is inclined relative to the fixed contacts to some extent in assembling. Consequently, the contact pressures can be equilibrated between the two pairs of contacts without being adversely affected by the inclination of the thermally responsive element in the three-phase thermal protector using the elastic plate. On the other hand, the above-described equilibrating adjustment cannot be carried out when the thermally responsive element is supported by a rigid member. Accordingly, separate contact pressure adjusting mechanisms need to be provided for the respective pairs of contacts, or the two pairs of contacts need to be assembled with such a high-level accuracy that the two pairs of contacts are simultaneously engaged and disengaged and that the contact pressures are rendered equal. This entails another problem.

The conventional three-phase thermal protectors include the generally circular thermally responsive element and are formed to have a relatively flat configuration and approximately equal longitudinal and lateral dimensions, as described above. Particularly when the protector is bound to end turns of the motor winding with strings, the protector thus mounted becomes unstable since the protector has a larger width than the end turns of the winding. The size of the electrically-driven compressor has recently been reduced and the diameter of the motor used in the compressor has also been reduced accordingly. The overall size of the conventional protector needs to be reduced when the width thereof is rendered smaller than that of the end turns of the winding. However, this reduces a current capacity of the protector and renders the manufacture of the protector difficult. This entails further another problem.

Furthermore, a work for attaching an insulating covering to the conventional thermal protector for the insulation thereof is troublesome since the protector is formed to have a relatively flat configuration and approximately equal longitudinal and lateral dimensions. A receptacle of the protector usually serves as an electrically conducting section. A failure such as short circuit occurs when the receptacle is brought into contact with another electrically conducting part or member. Accordingly, the thermal protector needs to be covered by the insulating covering such as a polyester tube. The polyester tube having an inner circumference larger than an outer circumference of the protector is put onto the protector to cover the latter. The tube is fixed to the surface of the protector by heat shrinkage. Since a polyester film does not have a large coefficient of heat shrinkage, the difference between the outer circumference of the protector and the inner circumference of the polyester tube is small. Accordingly, the generally cylindrical polyester tube needs to be deformed to a large extent in order to be fitted with the protector when the protector is formed to have a relatively flat configuration and approximately equal longitudinal and lateral dimensions. Thus, positioning the polyester tube is difficult and the work for attaching the tube to the protector is troublesome. This entails further another problem.

SUMMARY OF THE INVENTION

Therefore, an object of the present invention is to provide a generally slender flat thermal protector which can solve the above-described problems when particularly applied to the three-phase motors having wye connected windings, and which can readily be mounted on the end turns of the motor winding.

In the thermal protector of the present invention, imaginary lines between a connection between a thermally responsive element and an elastic plate and two movable contacts are at an angle of about 90 degrees or more, and the connection and the movable contacts form a substantial isosceles triangle. Unbalance in amounts of heat due to the respective phase currents acting on the thermally responsive element is compensated by the heating of other current-carrying members each electrically connected to the thermally responsive element. This construction renders the protector housing slender. The slender hermetic protector housing can readily be mounted on the end turns of the motor winding. Since the amounts of heat due to the phase currents acting on the thermally responsive element can be balanced, a uniform operation of the thermal protector can be achieved with respect to each of the motor phases.

The elastic plate supports the thermally responsive element at one end thereof. The elastic plate and a thermally responsive element support are formed and disposed so that the other end of the elastic plate is supported by the thermally responsive element support serving as another heating member so that heat from the thermally responsive element support effectively acts on the thermally responsive element.

A push piece is provided for calibrating an operating temperature of the thermally responsive element. A point of application of the push piece is slightly shifted from the middle point between the movable contacts on the thermally responsive element toward the end of the thermally responsive element at which the same is connected to the elastic plate and which end serves as a supported end. The push piece is secured to an inner surface of the housing at its end opposed to the point of application and supports the supported portion of the thermally responsive element when the thermally responsive element in an inoperative condition operates with snap action in response to an ambient temperature. This construction secures disengagement of the movable contacts secured to the thermally responsive element from the respective fixed contacts.

In order that a current flowing via the thermally responsive element support is prevented from being adversely affected by a current bypassing from the thermally responsive element to the housing via the point of application of the push piece, means is provided for restraining the current bypassing between the push piece and the thermally responsive element.

A positioning member may be disposed between the header plate and the fixed contact support when stable locations of the fixed contacts need to be maintained. Heat conductivity of the positioning member is utilized to cause heat due to spark accompanying disengagement of the movable contacts from the respective fixed contacts to escape to the housing side. Consequently, a current capacity of the thermal protector can be increased.

A material for the positioning member is preferably selected so that the positioning member serves as a heating member. The thermally responsive element is heated by the positioning member while the movable contacts are disengaged from the respective fixed contacts as the result of operation of the thermally responsive element, whereby the operation of the thermally responsive element to return to the former state is retarded. Consequently, the number of contact making and breaking operations of the thermal protector can be reduced and accordingly, the durability thereof can be improved.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
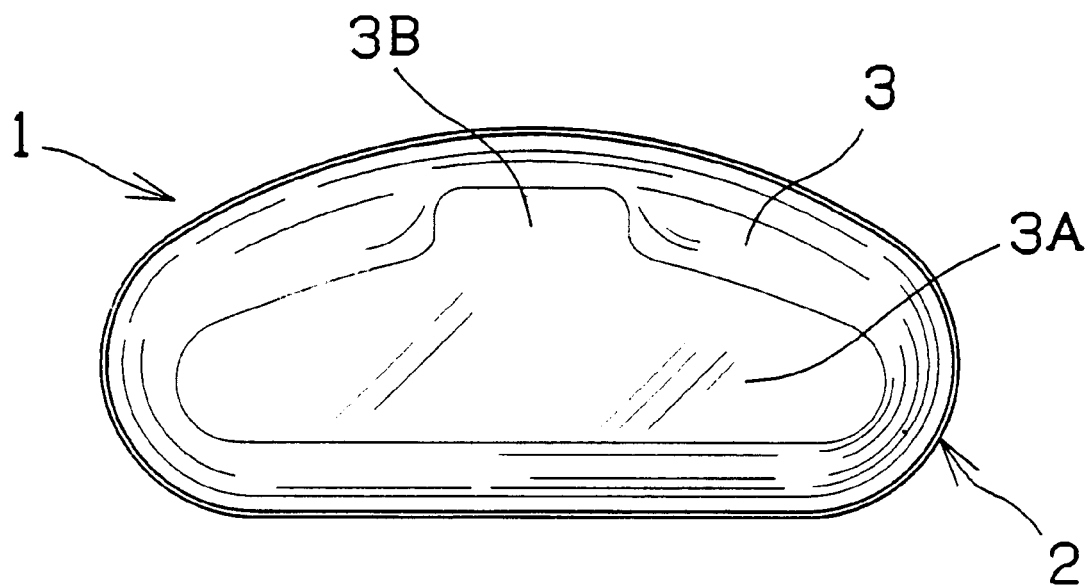
FIG. 1 is a plan view of the thermal protector of a first embodiment in accordance with the present invention.
Figure 2:
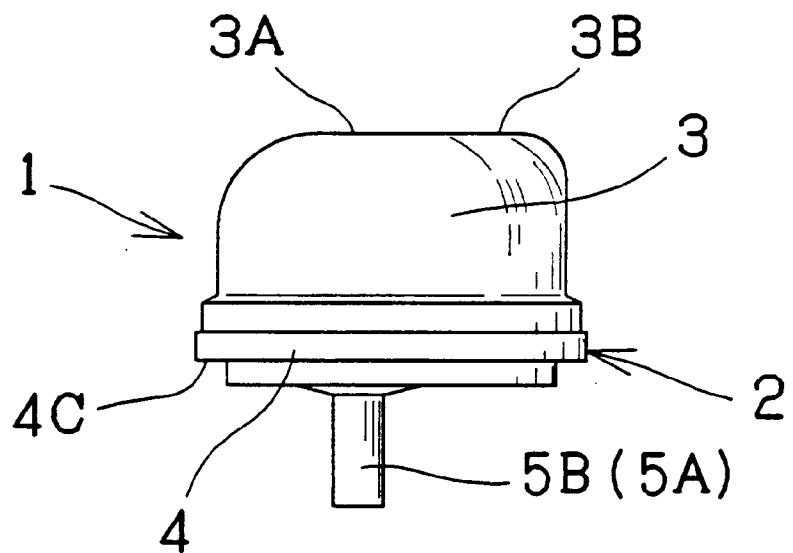
FIG. 2 is a side view of the thermal protector.

A first embodiment in accordance with the present invention will be described with reference to FIGS. 1 to 7. Referring first to FIGS. 1 to 4, a thermal protector 1 of the first embodiment is shown. The thermal protector 1 comprises a header plate 2 and a housing 3 both of which constitute a hermetic receptacle. The header plate 2 includes a metal plate 4 formed into such a shape that one of slowly arcuate portions of an ellipsoid is cut off. The metal plate 4 has two through holes 4A and 4B formed in the vicinity of opposite ends thereof respectively. Two electrically conductive terminal pins 5A and 5B are hermetically secured in the holes 4A and 4B by a filler 6 such as glass so as to extend therethrough in an insulated relation with the metal plate 4, respectively. The metal plate 4 of the header plate 2 has a sufficient thickness and is formed with a flange 4C having a reduced thickness and projecting by a predetermined length from the peripheral edge of the metal plate 4.

Figure 3:
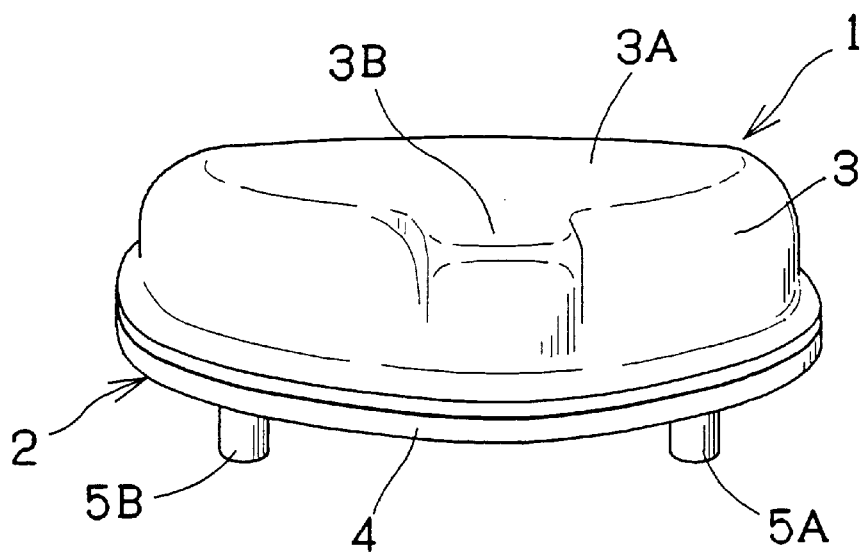
FIG. 3 is a perspective view of the thermal protector.

The housing 3 is made of a metal plate having a smaller thickness than the metal plate 4 and formed into the shape of a deep tray. The housing 3 has a plane configuration according to that of the metal plate 4. As shown in FIGS. 1 and 3, the housing 3 has a generally slender dome-shaped section and a flat portion 3A formed by rendering a semicircular top thereof flat. A calibrating portion 3B to be deformed in the calibration of an operating temperature as will be described later projects from the central flat portion 3A toward the other slowly arcuate portion which is substantially planar with the flat portion 3A. An open end of the housing 3 is butted against the peripheral flange 4C of the header plate 2 to be hermetically sealed by a ring projection welding or the like so that the above-described hermetic receptacle is formed, as shown in FIGS. 4 to 7.

One ends of fixed contact supports 7A and 7B are secured to one ends of the terminal pins 5A and 5B located inside the hermetic receptacle by welding or the like respectively. Two fixed contacts 8A and 8B are secured to the other ends of the fixed contact supports 7A and 7B respectively. It is preferable that surfaces of the fixed contacts 8A and 8B be plastically deformed from a spherical one to a flat one by pressing at least after the welding to the respective supports 7A and 7B so that the heights of the fixed contacts 8A and 8B become uniform. Consequently, the heights of the fixed contacts before the calibration of the operating temperature become uniform with high accuracy per product after assembly, whereupon a work for calibrating the operating temperature is easily carried out. Furthermore, movable contacts 14A and 14B are brought into contact with the flat surfaces of the fixed contacts 8A and 8B respectively. Accordingly, even when points of contact of the movable contacts 14A and 14B are horizontally displaced to some extent, the contact pressure is not varied as in the case where the movable and fixed contacts have curved surfaces. Consequently, the performance of the thermal protector can be stabilized.

Two insulating plates 9A and 9B made of ceramics such as alumina are disposed between the respective fixed contact supports 7A and 7B and the metal plate 4 in the embodiment. The insulating plates 9A and 9B serve as positioning members for defining distances between the respective fixed contact supports 7A and 7B and the metal plate 4. Furthermore, the positioning members 9A and 9B are elastically held between the respective fixed contact supports 7A and 7B and the metal plate 4. Consequently, no extra work is required for mounting the nonmetallic positioning members 9A and 9B on the header plate 2. Additionally, the positioning members 9A and 9B, when made of a material with a good thermal conduction, cause heat to rapidly escape from the respective fixed contacts 8A and 8B overheated by an arc produced upon disengagement of the movable contacts 14A and 14B from them or the like to the metal plate 4 to thereby decrease the temperatures of the fixed contacts 8A and 8B. Consequently, since wearout of the fixed contacts is prevented with rapid termination of the arc, the service life of the thermal protector can be improved.

Figure 7:
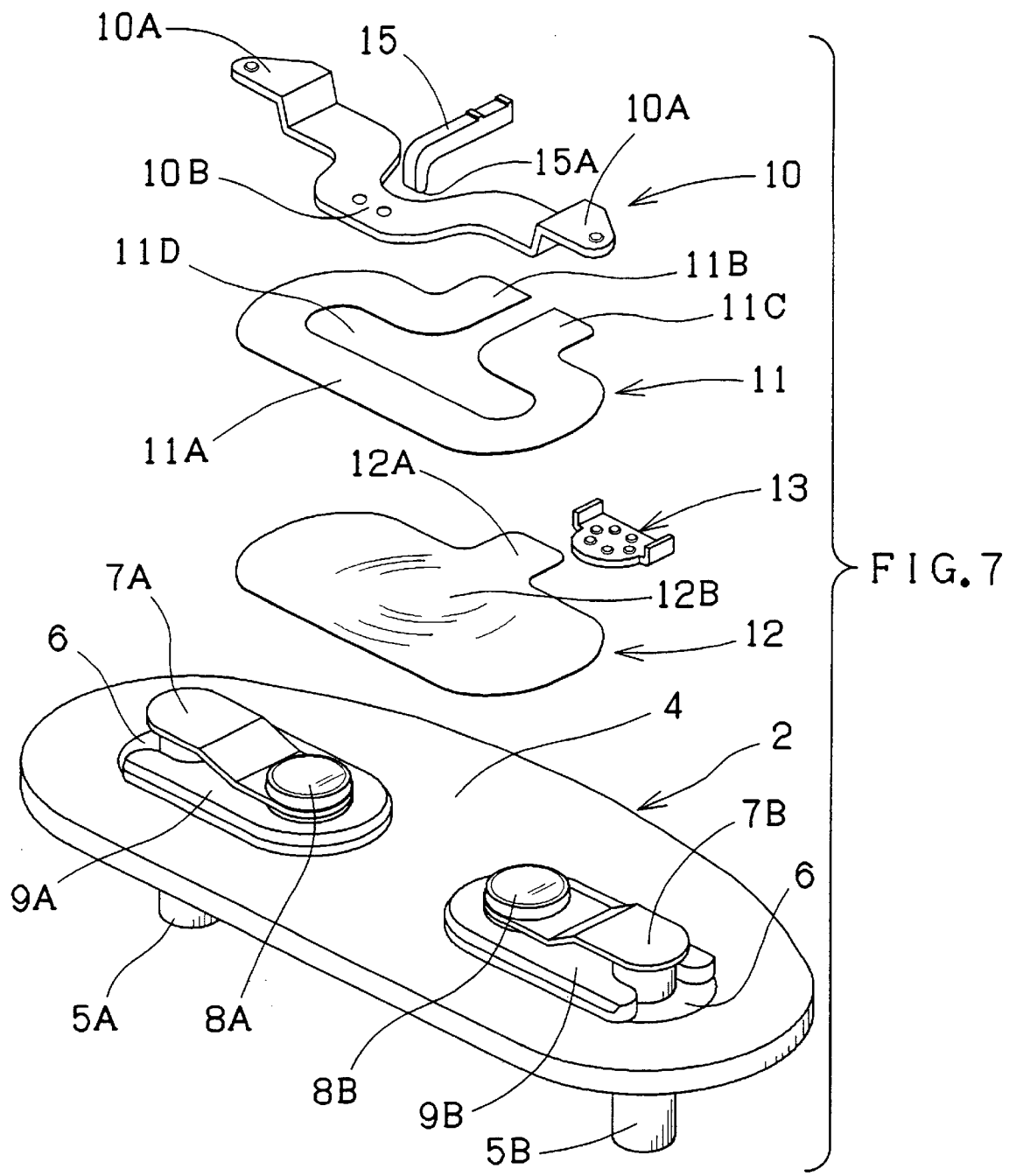
FIG. 7 is an exploded perspective of parts of the thermal protector with the housing being eliminated.

The positioning members 9A and 9B include U-shaped portions adjacent to the terminal pins 5A and 5B respectively. The positioning members 9A and 9B are interposed between the terminal pins 5A and 5B and the fixed contact supports 7A and 7B from the sides of the terminal pins after the fixed contact supports have been secured to the terminal pins, respectively, as shown in FIG. 7. However, the positioning members 9A and 9B may have through holes through which the terminal pins 5A and 5B may be inserted before the fixed contact supports 7A and 7B are fixed to the terminal pins, respectively, instead. The positioning members 9A and 9B secure electrical insulation between the metal plate 4 and the respective fixed contact supports 7A and 7B. The positioning members 9A and 9B are required in order to define the positions of the fixed contact supports 7A and 7B even when they are rendered thinner so as to serve as heating elements such that their rigidity is lowered. The positioning members 9A and 9B may be eliminated, for example, when each fixed contact support is formed with ribs so as to have a sufficient rigidity and a distance for insulation between the metal plate 4 and each fixed contact support is set at a predetermined value.

A thermally responsive element support 10 is fixed to an inner surface of the housing 3. The thermally responsive element support 10 is made of a slender metal plate with a sufficient rigidity. The thermally responsive element support 10 includes stepped fixed portions 10A at both ends thereof. The fixed portions 10A are welded to the inner surface of the housing 3 in the vicinity of ends of the latter to hold all the parts located at the side of the movable contacts. As best shown in FIG. 7, the thermally responsive element support 10 includes a middle portion 10B which is configured to detour so as not to interfere with a temperature calibrating mechanism which will be described later. The thermally responsive element support 10 is formed in its overall configuration to be symmetrical about the middle portion 10B. The middle portion 10B may have a central through hole which avoids the interference with a push piece 15 for the calibration of the operating temperature. The thermally responsive element support 10 serves as a heating element and heats a thermally responsive element 12 from the side opposed to the fixed contact supports 7A and 7B so that heating effects of phase currents flowing in three-phase Y-connected windings are balanced.

The fixed portions 10A of the thermally responsive element support 10 are provided at the respective ends thereof in order that the fixed portions 10A are spaced sufficiently from the calibrating portion 3B so that the thermally responsive element support 10 is fixed to a portion less affected by deformation when the calibrating portion 3B is deformed in a temperature calibrating work which will be described later. Furthermore, the thermally responsive element support 10 is provided with the two fixed portions 10A in order that even when one or both of the fixed portions are slightly displaced for some reason, an amount of displacement of the middle portion 10B to which an elastic plate 11 is to be fixed as will be described later can be rendered smaller as compared with the construction in which a thermally responsive element support is cantilevered.

The elastic plate 11 includes a middle portion 11A fixed to the middle portion 10B of the thermally responsive element support 10 by welding or another fixing technique. The elastic plate 11 is formed into a generally elliptic annular plate with a central opening 11D and an open side. Although both ends 11B and 11C of the elastic plate 11 are separated, an annular elastic plate having no such separated ends may be used, instead. As the result of provision of the opening 11D, the thermally responsive element support 10 serving as a heating element is directly opposite to the thermally responsive element 12 via the opening 11D so that radiant heat from the thermally responsive element support 10 directly reaches the thermally responsive element 12 through the opening 11D. Furthermore, the elastic plate 11 exerts, on the thermally responsive element 12, a clockwise biasing force about a supported portion thereof as viewed in FIG. 5, that is, a securing piece 13. The elastic plate 11 needs to have such a level of elasticity that the balance of the movable contacts 14A and 14B engaged with and disengaged from the respective fixed contacts 8A and 8B can be retained. Accordingly, a sectional area or thickness of the elastic plate 11 cannot be rendered large. The springiness and elasticity of the elastic plate 11 are varied depending upon the material therefor when a supplied current increases the temperature of the elastic plate 11. In this case, the characteristics of the thermal protector are varied disadvantageously. Accordingly, the elastic plate is preferably made of a metal plate having a low specific resistance and good springiness. For example, the elastic plate 11 may be made of a clad metal made by cladding steel plates with a good springiness on both sides of a copper plate with a low specific resistance. In this case, the clad metal is more preferred since the heating of the elastic plate can be restrained.

The thermally responsive element 12 comprises a thermally deformable member, such as a bimetal or trimetal, formed with a curved or shallow dish-shaped portion 12B. The thermally responsive element 12 is adjusted so as to reverse its state of curvature with snap action in response to a predetermined first temperature and return to its normal state of curvature with snap action in response to a predetermined second temperature. The thermally responsive element 12 has such an elongated configuration that two opposite sides about the center of a circle are cut off. The two movable contacts 14A and 14B are secured to longitudinal ends of the thermally responsive element 12 on one side surface thereof to be substantially symmetric about the curved portion 12B. The thermally responsive element 12 further includes a protrusion 12A integrally protruding from a central rear end thereof. The protrusion 12A is substantially a connected portion of the thermally responsive element 12 to the elastic plate 11 and a supported portion of the thermally responsive element. The securing piece 13 is secured to the protrusion 12A by welding or another fixing technique. In this condition, the curved portion 12B is formed by drawing so that the thermally responsive element 12 reverses its state of curvature and returns to its normal state of curvature in response to the respective first and second operating temperatures. The securing piece 13 is further secured to the elastic plate 11 by welding or another fixing technique. Accordingly, the securing piece 13 prevents the thermally responsive element 12 from being adversely affected by heat or stress caused when the thermally responsive element 12 is connected to another member or more specifically, the elastic plate 11 in the embodiment. Consequently, the previously adjusted operating temperatures are not almost varied. The securing piece 13 may be eliminated when small multipoint laser spot welding is employed for fixing the thermally responsive element 12 to another member such as the elastic plate 11 such that the variations in the operating temperatures of the thermally responsive element 12 due to the heat and stress offer no problem.

Heat is conducted from the fixed contacts 8A and 8B and the fixed contact supports 7A and 7B via the positioning members 9A and 9B and the metal plate 4 to the housing 3. Furthermore, both ends of the thermally responsive element support 10 are directly secured to the inner surface of the housing 3. Accordingly, the difference between an amount of heat generated inside the thermal protector and an amount of heat radiated outside the thermal protector is small while the supplied current is in a range permitting continuous operation of the motor. Accordingly, the temperature of the thermally responsive element 12 is not almost changed even when the current value permitting the continuous operation of the motor is increased. Consequently, the value of an ultimate trip current (U.T.C.) can be increased. On the other hand, in the occurrence of an excessively large current such as a locked rotor condition, the amount of internally generated heat is sufficiently larger than the amount of radiated heat. Accordingly, an operating time of the thermally responsive element 12 is short since an exceedingly large amount of heat is transmitted to the thermally responsive element. Consequently, a short time trip (S/T) required for disengagement of the contacts in occurrence of an overcurrent can be rendered short even when the thermal protector has the structure in which the heat is conducted from the fixed contacts 8A and 8B and the fixed contact supports 7A and 7B via the positioning members 9A and 9B and the metal plate 4 to the housing 3 and in which the thermally responsive element support 10 is directly secured to the housing inner surface, whereupon the thermal protector operates quickly. Thus, a material with high heat conductivity is selected for the positioning members 9A and 9B so that the value of U.T.C. can approach a current value at which the above-mentioned S/T is set at a predetermined value, for example, 10 seconds under the condition at the room temperature and so that a sufficient motor performance can be brought out.

The locations of the movable contacts 14A and 14B are set so that imaginary lines between the protrusion 12A serving as the connection between the thermally responsive element 12 and the elastic plate 11 and the respective movable contacts are at an angle of about 90 degrees or more and the protrusion 12A and the movable contacts 14A and 14B form a substantial isosceles triangle. As the above-described locational relationship between the protrusion 12A and the movable contacts 14A and 14B, the thermally responsive element 12 can be rendered slender along the direction of disposition of the terminal pins 5A and 5B. Consequently, the thermal protector can be rendered slender so as to be easily mounted on the motor winding.

The thermally responsive element 12 is fixed via the securing piece 13 to both ends 11B and 11C of the elastic plate 11. More specifically, the protrusion 12A of the thermally responsive element 12 is welded to a central flat portion of the securing piece 13, and surfaces of both standing ends of the securing piece 13 are welded to the elastic plate 11. The thermally responsive element support 10, the elastic plate 11 and the thermally responsive element 12 are disposed substantially in parallel with one another. Furthermore, the header plate 2 and the fixed contact supports 7A and 7B are also disposed substantially in parallel with the thermally responsive element 12. The movable contacts 14A and 14B are opposed to the fixed contact 8A and 8B respectively so as to be disengaged from and engaged with the respective fixed contacts with the reversing and returning operations of the thermally responsive element 12, thereby opening and closing the current path. Furthermore, the thermally responsive element 12 is elastically supported by the elastic plate 11. Consequently, the elastic plate 11 is flexed to equalize the contact pressures between the two contact pairs even when the thermally responsive element 12 is mounted with such a degree of inclination that the contact pressures are varied between the two contact pairs.

Figure 5:
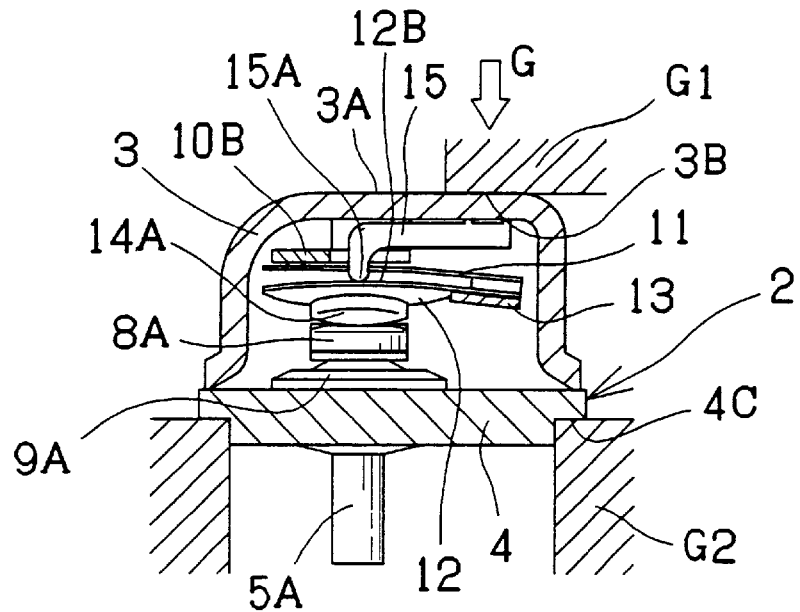
FIG. 5 is a view taken along line 5—5 in FIG. 4, showing an operating temperature calibrating process with temperature calibrating jigs being used.

One end of a push piece 15 serving as the temperature calibrating mechanism is secured to a portion of the inner surface of the housing 3 corresponding to the above-described calibrating portion 3B. The push piece 15 is made of a metal with a sufficient rigidity. One end of the push piece 15 is abutted against a normally convex surface of the thermally responsive element 12 in the vicinity of the middle point of the imaginary line between the movable contacts 14A and 14B or the center of the curved portion 12B at the room temperature, as shown in FIGS. 5 and 7. Thus, the push piece 15 exerts a pushing force on the normally convex surface of the thermally responsive element 12 in a manner as will be described later.

The calibration of the operating temperatures of the thermal protector 1 is executed after assembling of the parts accommodated in the housing 3 and completion of the hermetic receptacle. As shown in FIG. 5, the calibrating portion 3B of the housing 3 is collapsed by jigs G1 and G2 holding the header plate 2 and housing 3 therebetween. The jig G2 is disposed to receive approximately the entire periphery of the flange 4C of the header plate 2. The jig G1 is disposed to push the calibrating portion 3B in the direction of arrow G in FIG. 5 so that the calibrating portion is deformed to thereby displace the push piece 15. Consequently, the distal end 15A of the push piece 15 exerts a pushing force on the normally convex side of the thermally responsive element 12. The location of exertion of the pushing force corresponds to the middle point between the movable contacts 14A and 14B. The pushing force is received by the fixed contacts 8A and 8B via the respective movable contacts 14A and 14B. The contact pressures between the contact pairs are increased by the above-described deformation of the housing 3 and then suitably adjusted such that the operating temperature of the thermally responsive element 12 is calibrated so that the state of curvature thereof is reversed with snap action in response to the predetermined operating temperature as shown in FIG. 6.

One end of the push piece 15 is secured to the calibrating portion 3B. Accordingly, even when an amount of displacement of the calibrating portion 3B in the calibrating work is small, that of the other or distal end 15A of the push piece 15 is increased by leverage to a sufficiently large value. Furthermore, the thermally responsive element support 10 is fixed to the inner surface of the housing 3 in the vicinity of longitudinal ends thereof so as to be less affected even when the calibrating portion 3B is slightly deformed in the operating temperature calibrating work, as described above. Consequently, the thermally responsive element support 10 sustains substantially no deformation during the operating temperature calibrating process. Furthermore, the elastic plate 11 exerts, on the thermally responsive element 12, a clockwise biasing force about the securing piece 13 serving as the supported portion of the thermally responsive element so that the thermally responsive element is normally thrust against the push piece 15, as viewed in FIG. 5. Consequently, the thermally responsive element 12 reliably reverses its state of curvature so that the movable contacts 14A and 14B are disengaged from the respective fixed contacts 8A and 8B. Furthermore, the reversing operation of the thermally responsive element 12 with snap action can prevent chattering produced in the disengagement of the movable contacts from the fixed contacts.

Figure 4:
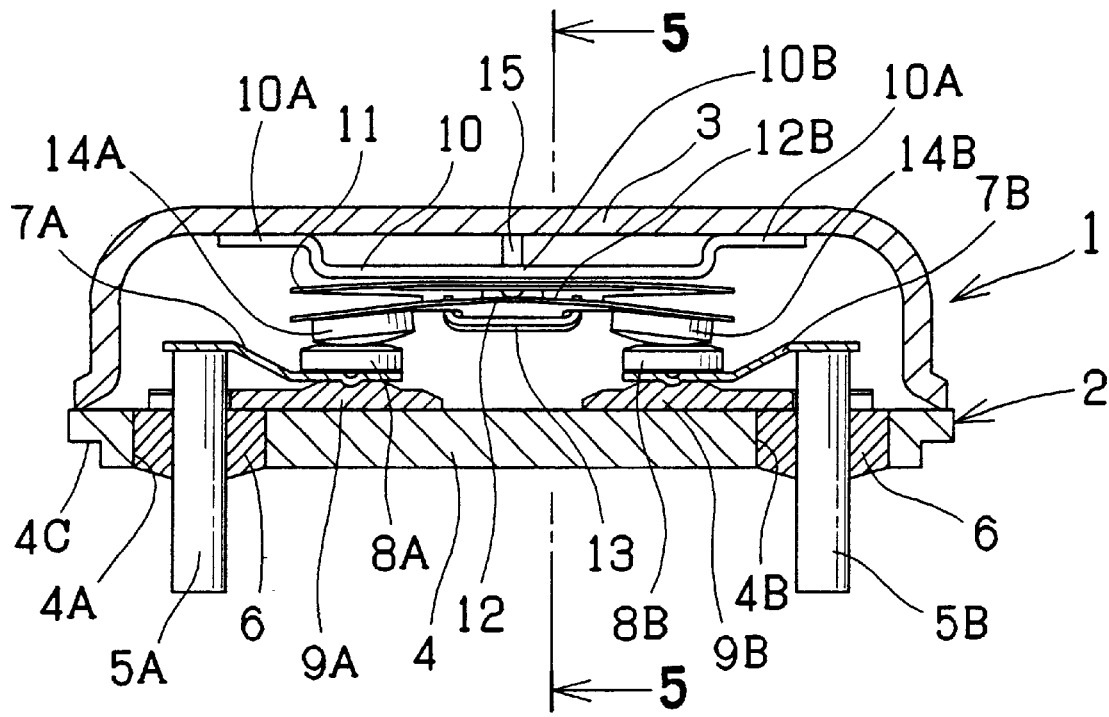
FIG. 4 is a longitudinal section of the thermal protector.
Figure 6:
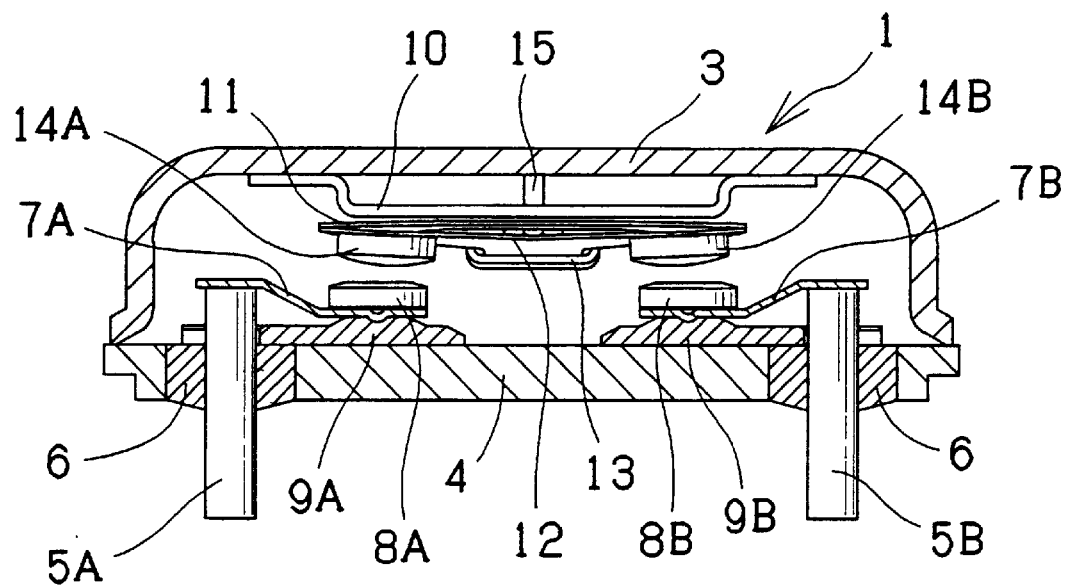
FIG. 6 is a longitudinal section of the thermal protector under the condition where the movable contacts have been disengaged from the respective fixed contacts.

In the thermal protector 1 constructed as described above, the thermally responsive element 12 reverses its state of curvature with snap action when the ambient temperature reaches a predetermined first operating temperature, for example, 130° C., thereby simultaneously disengaging the movable contacts 14A and 14B from the respective fixed contacts 8A and 8B, as shown in FIG. 6. Thereafter, the thermally responsive element 12 returns to its normal state of curvature with snap action when the ambient temperature drops to a second predetermined operating temperature, for example, 90° C., thereby simultaneously re-engaging the movable contacts 14A and 14B with the respective fixed contacts 8A and 8B, as shown in FIG. 4.

The thermal protector 1 is preferably connected to a neutral point of Y-connected windings of a three-phase motor. More specifically, the terminal pins 5A and 5B and the metal plate 4 or the housing 3 are connected to coil ends serving as the neutral point of the Y-connected windings respectively. An amount of heat generated by each part constituting a current path is increased when an abnormal condition of the motor to be protected by the thermal protector 1 increases a motor current. The thermally responsive element 12 reverses its state of curvature with snap action to disengage the movable contacts 14A and 14B from the respective fixed contacts 8A and 8B when the first operating temperature is reached, thereby cutting off power supply to the motor. A resistance value of each current path on the thermally responsive element 12 and accordingly, an amount of heat generated by each current path differ between the case where current flows across the movable contacts 14A and 14B to the thermally responsive element 12 and the case where current flows across each movable contact and the securing piece 13 to the thermally responsive element 12. The resistance values of the fixed contact supports 7A and 7B and the thermally responsive element support 10 each serving as a heating element and a heat exchange relationship between the thermally responsive element and each of these heating element are suitably set so that the operating conditions of the thermal protector with respect to the phases of the three-phase motor are uniformed. Consequently, it is possible to substantially uniform the conditions of temperature increase in the thermally responsive element when the current flows through each current path.

In the conventional thermal protectors, the movable contacts and the supported portion are disposed to form an imaginary substantially equilateral triangle. As a result, current paths on the thermally responsive element are substantially equidistant from one another, whereby amounts of heat generated by the respective phase currents are balanced. In the present invention, however, imbalance in the amounts of generated heat is compensated by the other heating elements so that the amounts of heat are substantially balanced.

The movable contacts 14A and 14B and supported portion are disposed on the thermally responsive element 12 to form an imaginary isosceles triangle in which the angle between two imaginary equal sides thereof is at about 90 degrees or more. Furthermore, other parts are disposed approximately in parallel with the thermally responsive element 12. Consequently, the thermal protector of the present invention can be rendered slender as compared with the conventional thermal protectors having approximately equal longitudinal and lateral dimensions. Accordingly, the thermal protector can readily be mounted on the motor winding. Additionally, a portion of the housing 2 including the calibrating portion 3B is slightly expanded. The configuration of the thermal protector 1 is designed to fit an outer peripheral configuration of a stator winding of the motor, whereby the thermal protector can more readily be mounted on the motor winding.

The metal push piece 15 is used in the thermal protector 1 of the foregoing embodiment. A problem sometimes arises that the current which should flow via the housing 3 to the thermally responsive element support 10 directly bypasses via the push piece 15 to the thermally responsive element 12 in spite of a contact resistance of the distal end 15A when the resistance value of the thermally responsive element support serving as the heating element is increased. In such a case, the push piece 15 is formed into an electrically insulator or the distal end 15A of the push piece is insulated by ceramics, a polyamide sheet, etc. Furthermore, even when the resistance of the thermally responsive element support 10 is not increased, contact portions of the push piece and thermally responsive element are preferably insulated by the above-described insulator.

The insulating plates 9A and 9B made of the nonconductive ceramics are used as the positioning members in the foregoing embodiment. The positioning members may be made of an electrically resistive heating material, instead. The resistive heating material preferably includes conductive ceramics having high thermal conductivity and specific resistance, for example, ceramics of balium titanate system or new ceramics of non-oxide system such as boron nitride (BN) and silicon carbide (SiC). Furthermore, a thin resistive film may be formed on the nonconductive ceramics.

In use of the resistive heating material, a resistance value thereof is set to be larger than those of the current paths from the housing 3 or metal plate 4 to the fixed contacts 8A and 8B via the elastic plate 11 and the thermally responsive element 12. Consequently, almost no current flows through each of the positioning members made of the electrically resistive heating material and accordingly, each positioning member does not generate heat while the movable contacts 14A and 14B are engaged with the fixed contacts 8A and 8B respectively. However, an amount of heat generated by each positioning member is increased with an increase in voltage applied to each positioning member immediately when the thermally responsive element 12 reverses its state of curvature to disengage the movable contacts 14A and 14B from the respective fixed contacts 8A and 8B. The temperature in the thermal protector 1 is thus increased. Since heat generated by each positioning member made of the electrically resistive heating material is transmitted to the thermally responsive element, a period required for the temperature of the thermally responsive element to fall to the second operating temperature can be extended such that an "off" period can be rendered longer relative to an "on" period. Furthermore, the amount of heat generated by each positioning member can be set at such a large value that the thermally responsive element does not return to the normal state of curvature unless the power supply is turned off. The above-described construction allows the temperature of the motor winding to be reliably lowered by the thermal protector. Furthermore, since the number of contact making and breaking operations of the thermal protector is reduced, the durability thereof can be improved and stable operating characteristics can be achieved. Additionally, the positioning members may be made of a conductive ceramic, such as PTC, suddenly increasing its resistance value in response to a predetermined temperature. In this case, the temperature of the resistive heating material and accordingly, the temperature inside the thermal protector can readily be controlled. Furthermore, the influence of arc produced in the disengagement of the contacts can be reduced and accordingly, the service life of the thermal protector can greatly be improved.

Figure 26:
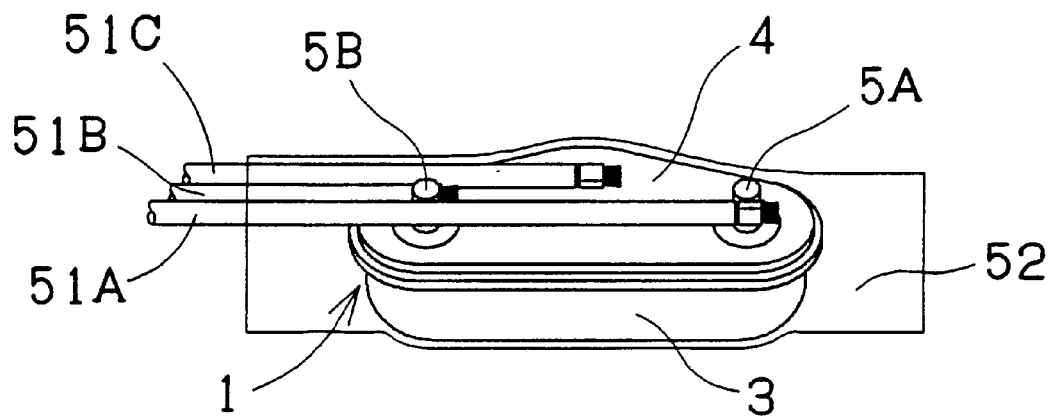
FIG. 26 is a perspective view of the thermal protector covered by an insulating tube after assembly.
Figure 27:
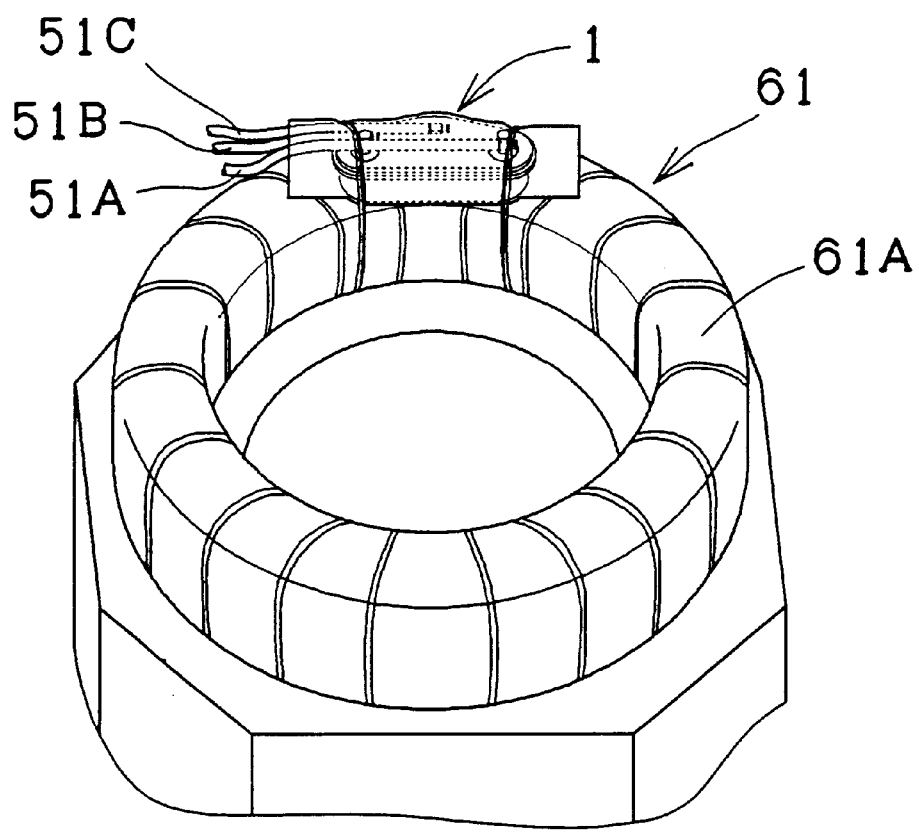
FIG. 27 is a perspective view of the thermal protector mounted on the end turns of the motor winding.

The mounting of the thermal protector 1 on the motor winding will now be described. One ends of lead wire 51A, 51B and 51C are connected to the terminal pins 5A and 5B and the metal plate 4 or the housing 3 directly or via terminal strips respectively, as shown in FIGS. 26 and 27. The other ends of the lead wires are connected to the neutral point sides of three-phase windings constituting a stator winding 61A of an electric motor 61. An insulating covering 52 such as polyester or polyamide is put onto the thermal protector 1 and fitted thereon by means of heat shrinkage or by ultrasonic welding. The thermal protector 1 thus covered by the insulating covering 52 is placed on the end turns of the stator winding to be mounted thereto by strings. Since the thermal protector 1 of the present invention is slender as compared with the conventional thermal protectors, the width of the thermal protector 1 can readily be rendered equal to or smaller than that of the end turns. Furthermore, since the thermal protector 1 is disposed along an outer peripheral arc of the end turns, the mounting work can be simplified.

The thermal protector 1 is generally slender while it has a structure suitable for protecting three-phase motors. Since the thermal protector 1 is easily inserted into the heat-shrinkable tube 52 such as the polyester tube, the working efficiency can be improved.

Although the thermal protector is mounted on the three-phase motor for protection of the latter in the foregoing embodiment, it may be used for protecting single-phase motors. In this case, current is supplied across the terminal pins 5A and 5B so that the current path is opened by the two pairs of contacts. Consequently, a contact opening and closing capacity of the thermal protector can be improved. Furthermore, if one of the contact pairs should not be opened, the other pair could be opened. As a result, the service life of the thermal protector can be improved, and the current path can reliably be cut off.

The thermal protector of the invention can readily be designed so that the amount of heat generated by the thermally responsive element support 10 and the fixed contact supports 7A and 7B is rendered larger than that generated by the thermally responsive element 12 in order that the degree of dependence on the heating of the thermally responsive element is lowered. Accordingly, the movable contacts and supported portion need not be disposed to form an imaginary substantially equilateral triangle and the lengths of the current paths on the thermally responsive element need not be equalized. As a result, the thermally responsive element 12 can be rendered slenderer than those used in the conventional thermal protectors. Furthermore, the other parts are disposed approximately in parallel with the thermally responsive element 12. Consequently, the thermal protector of the present invention can be rendered slender as compared with the conventional thermal protectors having approximately equal longitudinal and lateral dimensions. Accordingly, the thermal protector can readily be mounted on the motor winding. Although the thermal protector 1 is mounted on the winding of the stator having a small diameter, it has a sufficient opening and closing capacity. Consequently, the thermal protector 1 provides a long service life and superior protecting performance.

The insulating plates 9A and 9B are interposed between the metal plate 4 of the header plate 2 and the respective fixed contact supports 7A and 7B. The insulating plates 9A and 9B serve as the positioning members for defining the distances between the metal plate 4 and the respective fixed contact supports. The distal end of each fixed contact support can reliably be held at a predetermined location even when the thickness of each fixed contact support is reduced. Consequently, sufficiently high withstand voltages can be ensured for the metal plate 4 and the fixed contact supports 7A and 7B and an amount of heat generated by each fixed contact support when current flows therethrough can be increased.

Since the positioning members 9A and 9B are held between the header plate 2 and the respective fixed contact supports 7A and 7B, the positioning members can readily be mounted. Furthermore, heat generated by the contacts and the fixed contact supports 7A and 7B and heat generated by the thermally responsive element support 10 are effectively transferred to the housing 3 so that a ratio of S/T in the occurrence of an excessively large current to U.T.C. is increased to such an extent that the performance of the motor is sufficiently brought out.

FIGS. 11 to 14 illustrate a second embodiment of the present invention. The second embodiment is directed to a modified form of the push piece 15 in the first embodiment. The identical parts are labeled by the same reference symbols in the second embodiment as in the first embodiment.

Figure 8:
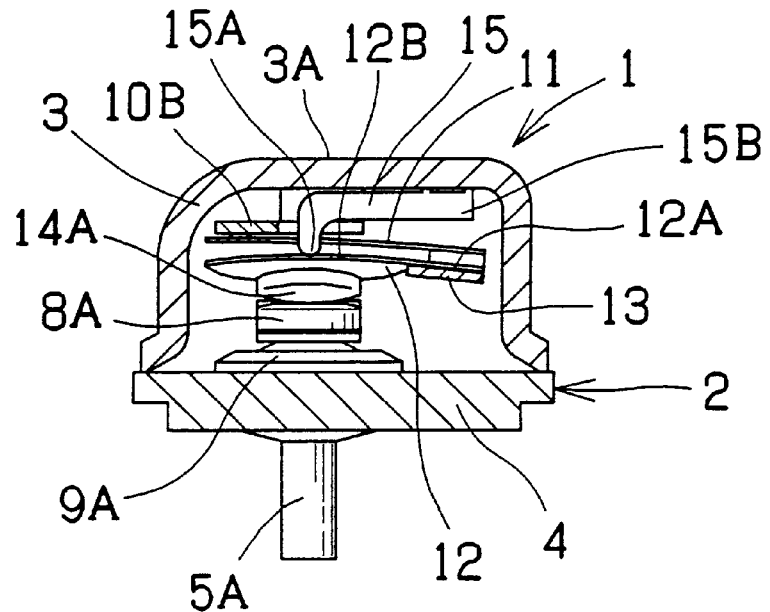
FIG. 8 is a view taken along line 5—5 in FIG. 4, showing the state immediately before the thermally responsive element is operated.
Figure 9:
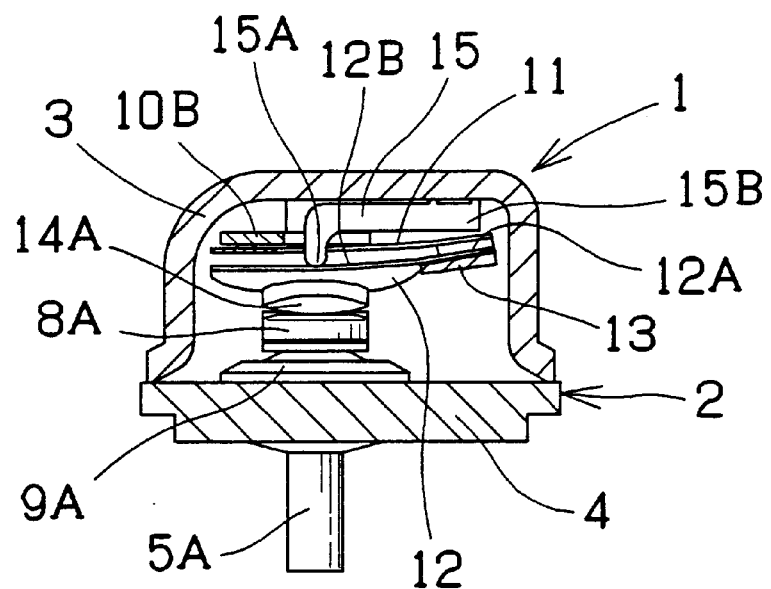
FIG. 9 is a view similar to FIG. 8, showing the thermally responsive element assuming the condition of FIG. 8 has abnormally been operated.
Figure 10:
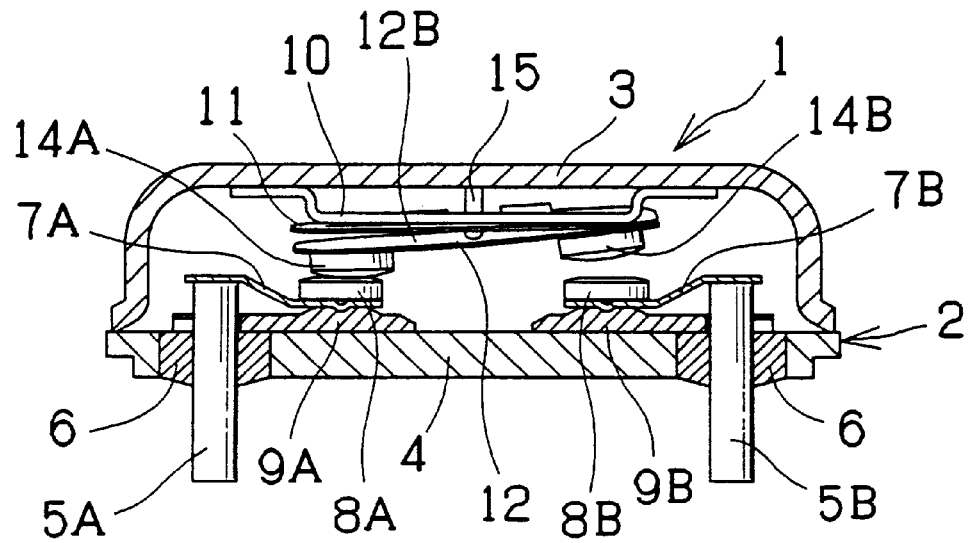
FIG. 10 is a longitudinal section of the thermal protector shown in FIG. 9 viewed from a different angle.

Referring to FIGS. 8 to 10, a possible abnormal condition of the thermal protector 1 will first be described. FIG. 8 illustrates the state of the thermally responsive element 12 before its reversing operation. When the first operating temperature is reached, the thermally responsive element 12 reverses its state of curvature, thereby disengaging the movable contacts 14A and 14B from the respective fixed contacts 8A and 8B. However, after a continuous use of the thermal protector 1 for a long period, heat due to arc produced during engagement and disengagement of the contacts renders the surface of each contact less smooth. Consequently, there is a possibility that each movable contact may be tack-welded to the corresponding fixed contact. When the degree of tack welding is low, the tack-welded contact is usually separated by the reversing operation of the thermally responsive element 12 and a separating force imparted by the elastic plate 11 to the thermally responsive element. However, dependence upon the spring force of the elastic plate 11 for separation of the tack-welded contact has a definite limit. More specifically, the elastic plate 11 has the central relatively large opening 11D through which the distal end of the push piece 15 is inserted and radiant heat from the thermally responsive element support 10 is transferred. Furthermore, the elastic plate 11 has such an elasticity as to be easy to be twisted for the balance of the contact pressures between the two contact pairs. Accordingly, the elastic plate 11 tends to lack the rigidity against the twist the elastic plate undergoes when one of the movable contacts is tack-welded to the fixed contact and the thermally responsive element 12 is displaced so as to be inclined. As a result, the tack-welded movable contact cannot sometimes be separated in spite of the reversing operation of the thermally responsive element when the tack weld exceeds the low degree as described above, as shown in FIGS. 9 and 10.

The inventors conducted experiments to find out the cause for the above-described problem and found the following facts. The push piece 15 secured at its one end to the inner surface of the housing 3 is abutted at its other end against the portion of the thermally responsive element 12 in the middle between the movable contacts 14A and 14B. Accordingly, when one of the movable contacts 14A and 14B is tack-welded to the corresponding fixed contact, the thermally responsive element 12 bends backward with the point of abutment of the push piece 15 as a fulcrum such that the other contact pair side and the protrusion 12A side are raised. A rear end 15B of the L-shaped push piece 15 in the first embodiment is not abutted against the protrusion 12A of the thermally responsive element 12. In this construction, the push piece 15 does not prevent rise of the portion of the thermally responsive element other than the side of the tack-welded movable contact. Accordingly, the reversing operation of the thermally responsive element 12 does not increase a separating force for the tack-welded contact but acts to raise the other portion. If the rigidity of the elastic plate 11 should be increased to prevent the protrusion 12A as a free end from rising, the adjustment of contact pressure between each of the contact pairs would be required and accordingly, the manufacturing process would be complicated.

Figure 11:
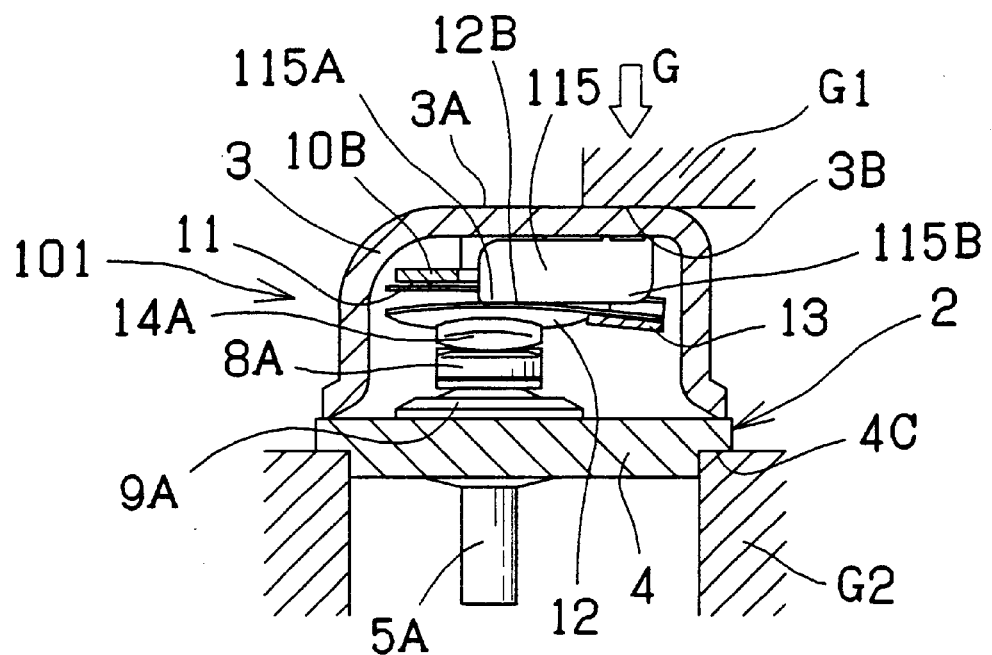
FIG. 11 is a sectional view similar to FIG. 5, showing the thermal protector of a second embodiment in accordance with the present invention.
Figure 12:
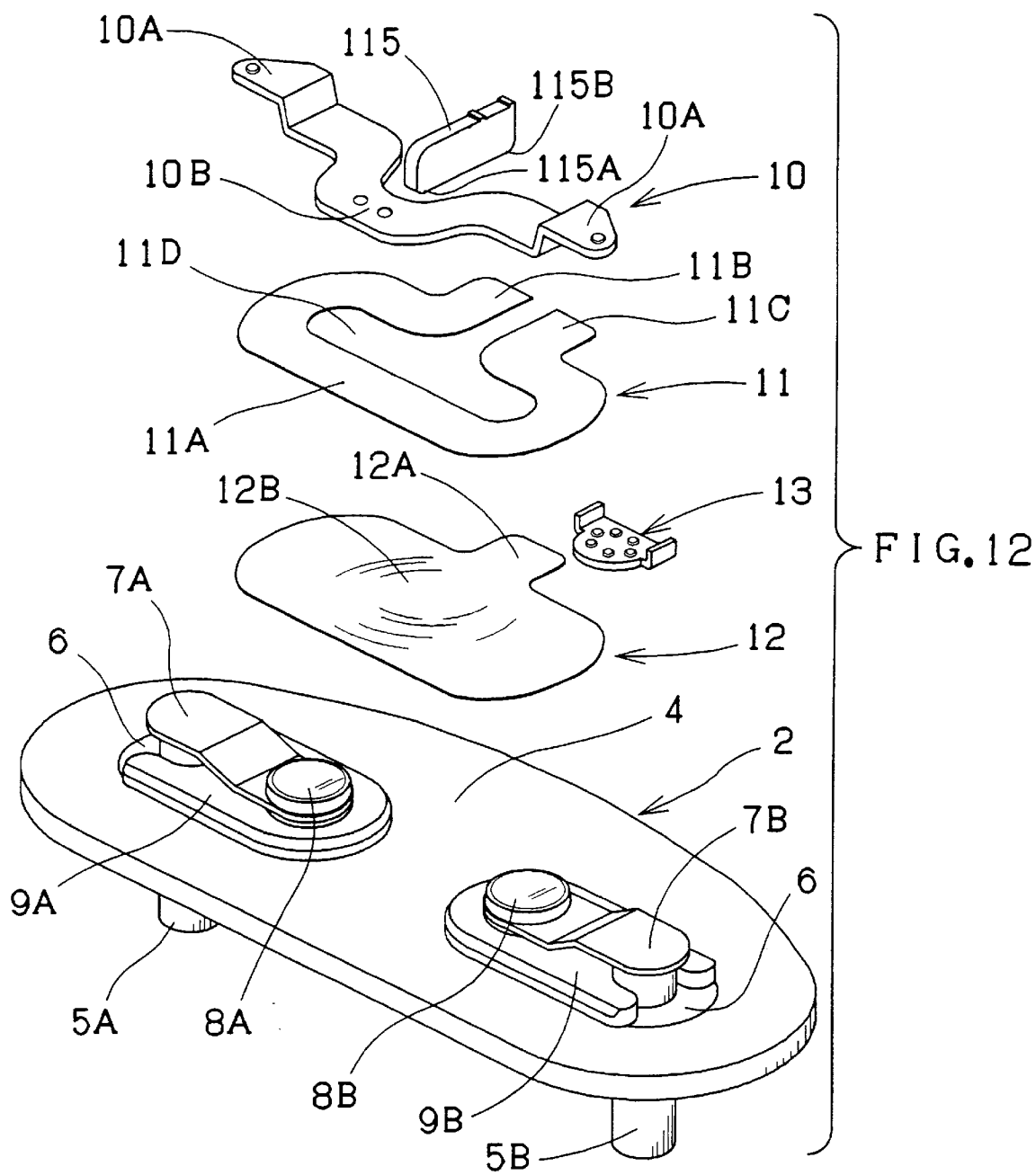
FIG. 12 is a view similar to FIG. 7 in the second embodiment.
Figure 13:
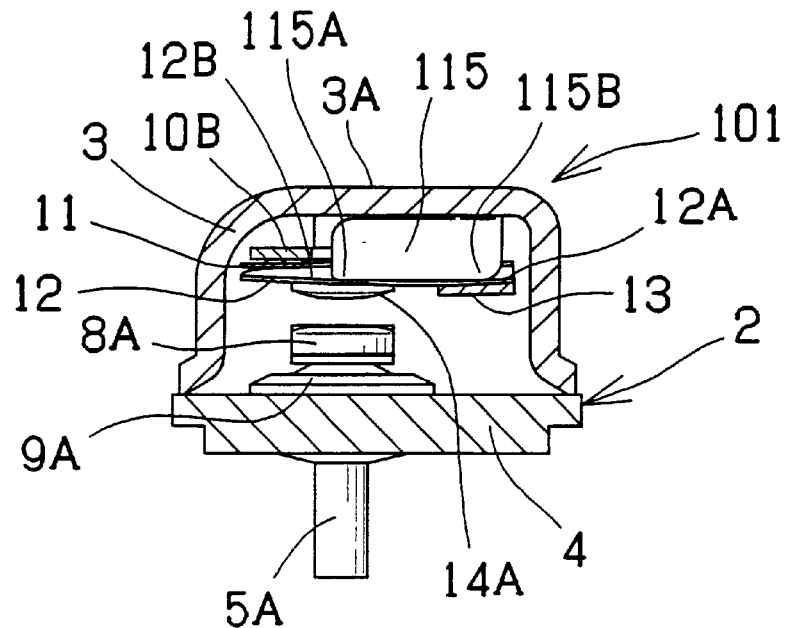
FIG. 13 is a sectional view of the thermal protector showing the condition where the thermally responsive element assuming the condition of FIG. 11 has been operated.
Figure 14:
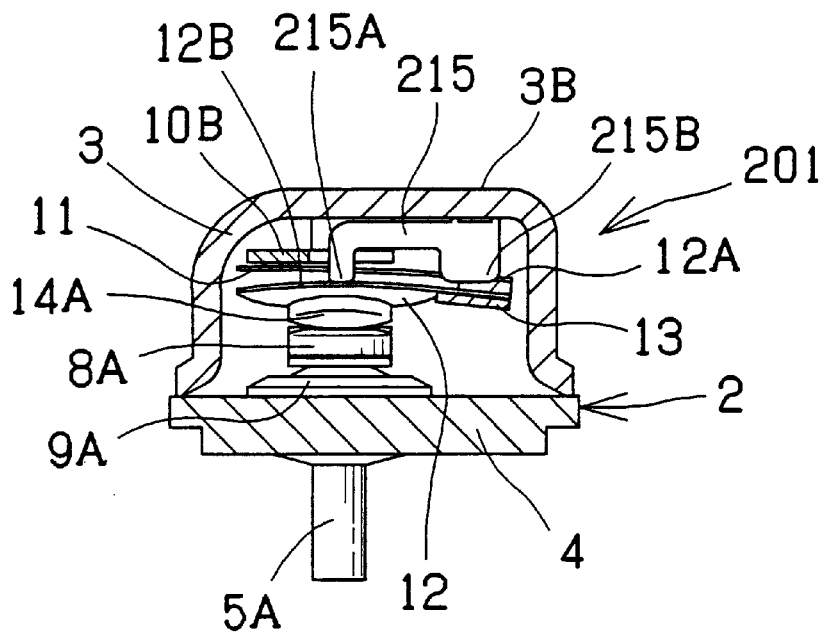
FIG. 14 is a sectional view similar to FIGS. 8 and 11, showing the thermal protector of a third embodiment in accordance with the present invention.

To solve the above-described problem, the second embodiment provides an improved thermal protector as shown in FIGS. 11 to 13. In the thermal protector of the second embodiment, the distal end 115A of the push piece 115 is abutted against the thermally responsive element 12 in the same manner as in the first embodiment. Moreover, the push piece 115 can also be contacted with the protrusion 12A or the supported portion of the thermally responsive element 12 at the side of the proximal end secured to the housing 3 to thereby limit the rise of the protrusion 12A side during the reversing operation of the thermally responsive element 12.

The protrusion 115 has a rear end 115B which is opposed to the distal end 115A and in contact with the protrusion 12A with a faint force or in close vicinity thereto before the reversing operation of the thermally responsive element 12. It is preferred that the rear end 115B should be isolated from the protrusion 12A by a distance which is at or below one half of an amount of free movement of the protrusion 12A when the reversing operation of the thermally responsive element 12 springs the protrusion 12A up in the condition where either one of the movable contacts 14A and 14B has been tack-welded to the corresponding fixed contact. As the result of this construction, the rear end 115B of the push piece 115 abuts against the protrusion 12A to thereby limit the rise thereof when the thermally responsive element 12 reverse its state of curvature in response to a predetermined temperature increase. Accordingly, the thermally responsive element 12 moves so as to disengage, from the fixed contacts 8A and 8B, the respective movable contacts 14A and 14B opposite to the protrusion 12A the motion of which is restricted. Consequently, a force due to the reversing operation of the thermally responsive element 12 effectively acts to disengage the movable contacts 14A and 14B from the respective fixed contacts 8A and 8B. The configuration of the push piece 115 to achieve a close disposition relation between the rear end 115B of the push piece 115 and the protrusion 12A should not be limited to that shown in FIGS. 11 to 13. Although the push piece 115 has the distal end 115A and the rear end 115B located at approximately the same level and a linear lower side in the second embodiment, the push piece 215 may have a recessed portion in a middle portion of the lower side thereof as shown as a third embodiment in FIG. 14.

In the thermal protectors 101 and 201 of the respective second and third embodiments, the distal end and the rear end of the push piece have approximately the same height or width. However, the rear end of the push piece may have a height or width smaller than the distal end thereof if the protrusion 12A abuts against the rear end of the push piece during the reversing operation of the thermally responsive element 12. More specifically, an experiment conducted by the inventors show that the difference h3 between the heights h1 and h2 of the distal end and the rear end of the push piece is preferably at or below one twentieth of a distance between the center of the curved portion of the thermally responsive element and distal end of the protrusion, as shown as another embodiment in FIG. 19 which will be described later. The experiment further shows that a desired effect was achieved when the distance was about 8.5 mm and the difference h3 was at or below 0.4 mm.

As described above, the protrusion 12A side of the thermally responsive element 12 bent backward is caught by the rear end of the push piece during the reversing operation of the thermally responsive element in the second and third embodiments. A reaction displaces the movable contact side of the thermally responsive element 12 to a larger extent. Even when one of the movable contacts has been tack-welded to the fixed contact with a tack welding force exceeding the above-described slight degree of tack weld, the reversing operation of the thermally responsive element 12 effectively acts on the tack-welded movable contact. Consequently, the service life of each of the thermal protectors 101 and 201 can be extended. The other construction of each thermal protector is the same as in the first embodiment.

The distal ends of the push pieces are abutted against the thermally responsive elements in the thermal protectors of the first to third embodiments respectively. The location of abutment is in the vicinity of the center of the curved portion 12A of the thermally responsive element 12, which center is in the middle of the movable contacts 14A and 14B secured to the thermally responsive element. An experiment conducted by the inventors shows that the occurrence of tack weld of the contact can be reduced when the location of abutment of the distal end of the push piece is preferably shifted toward the protrusion 12A serving as the supported portion of the thermally responsive element 12 relative to the center of the curved portion. An endurance test was carried out with respect to the thermal protectors in each of which the location of abutment of the distal end of the push piece is shifted by 0.5 mm forward and backward along an imaginary line between the distal end and the protrusion 12A relative to the center of the curved portion of the thermally responsive element 12. All the thermal protectors in which the location of abutment was shifted toward the protrusion 12A met the requirements of the operating period and the number of operations (2,000 times in fifteen days, in the test). However, some of the thermal protectors in which the location of abutment was shifted in the direction opposite to the protrusion 12A did not meet the requirements. The reason for the failure to meet the requirements was the tack weld of either movable contact to the corresponding fixed contact.

Regarding the thermal protectors in each of which the location of abutment is shifted toward the protrusion, it is inferred that an amount of movement of each movable contact during the reversing operation is reduced as the result of execution of the operating temperature calibrating work since the thermally responsive element is pressed down and accordingly, a force required for separating the tack-welded movable contact from the fixed contact is rendered small. Regarding the thermal protectors in which the location of abutment of the push piece is shifted toward the protrusion relative from the center of the curved portion, it is inferred that since the free end side of the thermally responsive element is moved to a large extent during the reversing operation of the thermally responsive element, a sufficient distance can be secured between the movable and fixed contacts of the respective contact pairs and a force required for the separation of the tack-welded contact is rendered larger. Thus, the possibility of tack welding of the contacts can be reduced by an effective use of the force due to the reversing operation of the thermally responsive element when the location of abutment of the push piece is set to be shifted toward the protrusion 12A relative to the center of the curved portion of the thermally responsive element.

FIGS. 15 to 18 illustrate a fourth embodiment of the invention. In the thermal protector 301 of the fourth embodiment, an insulating strip 16 is interposed between the thermally responsive element 12 and the elastic plate 11 to electrically insulate the thermally responsive element from the push piece 115 of the thermal protector 101 of the second embodiment. The addition of the insulating strip 16 is already mentioned as the modified form in the description of the first embodiment. A concrete form of the insulating strip 16 will be described here. The insulating strip 16 can readily be attached when inserted into a space between the two parts and can be prevented from displacement resulting in the falling off without any preventing means.

Figure 15:
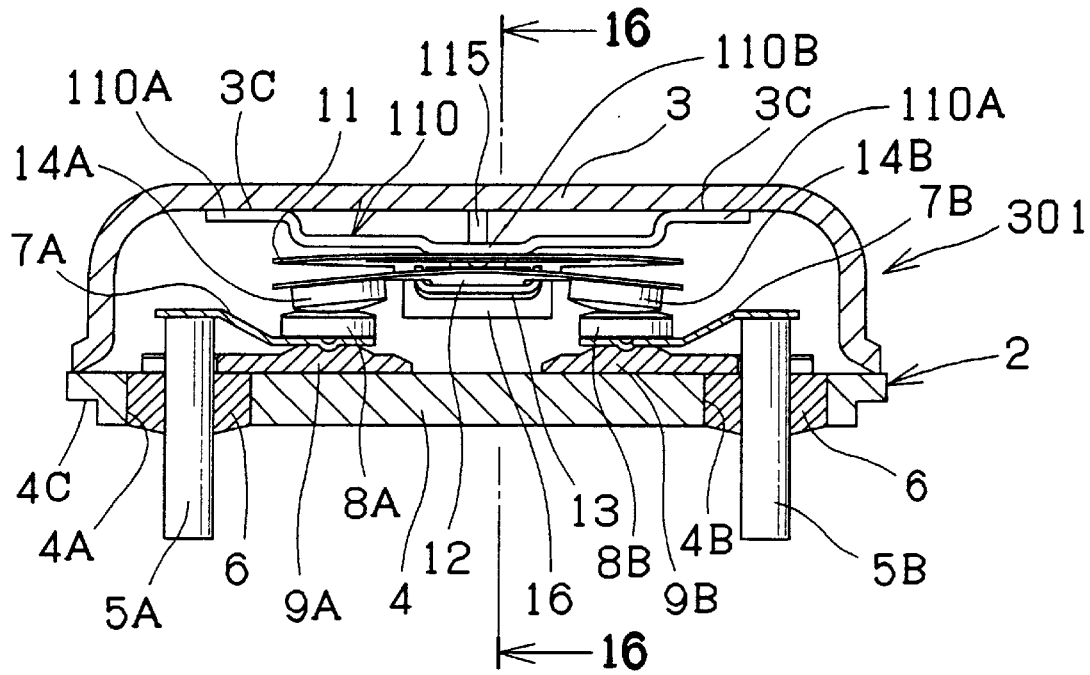
FIG. 15 is a longitudinal section of the thermal protector of a fourth embodiment in accordance with the present invention.
Figure 17:
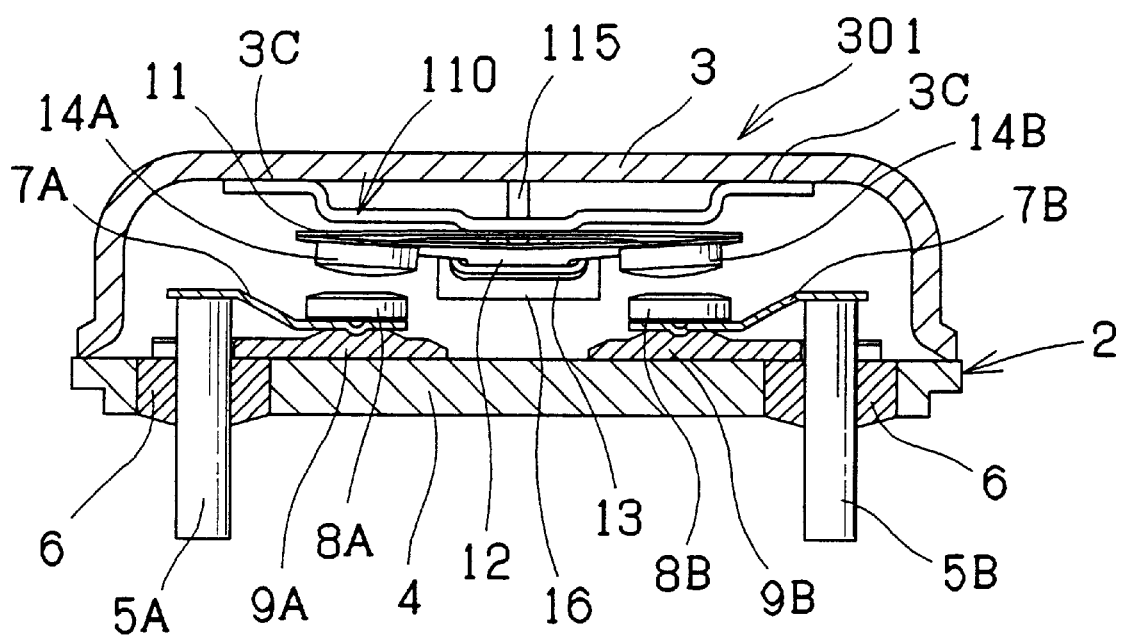
FIG. 17 is a longitudinal section of the thermal protector under the condition where the thermally responsive element assuming the condition of FIG. 15 reverses its curvature in response to the ambient temperature.
Figure 18:
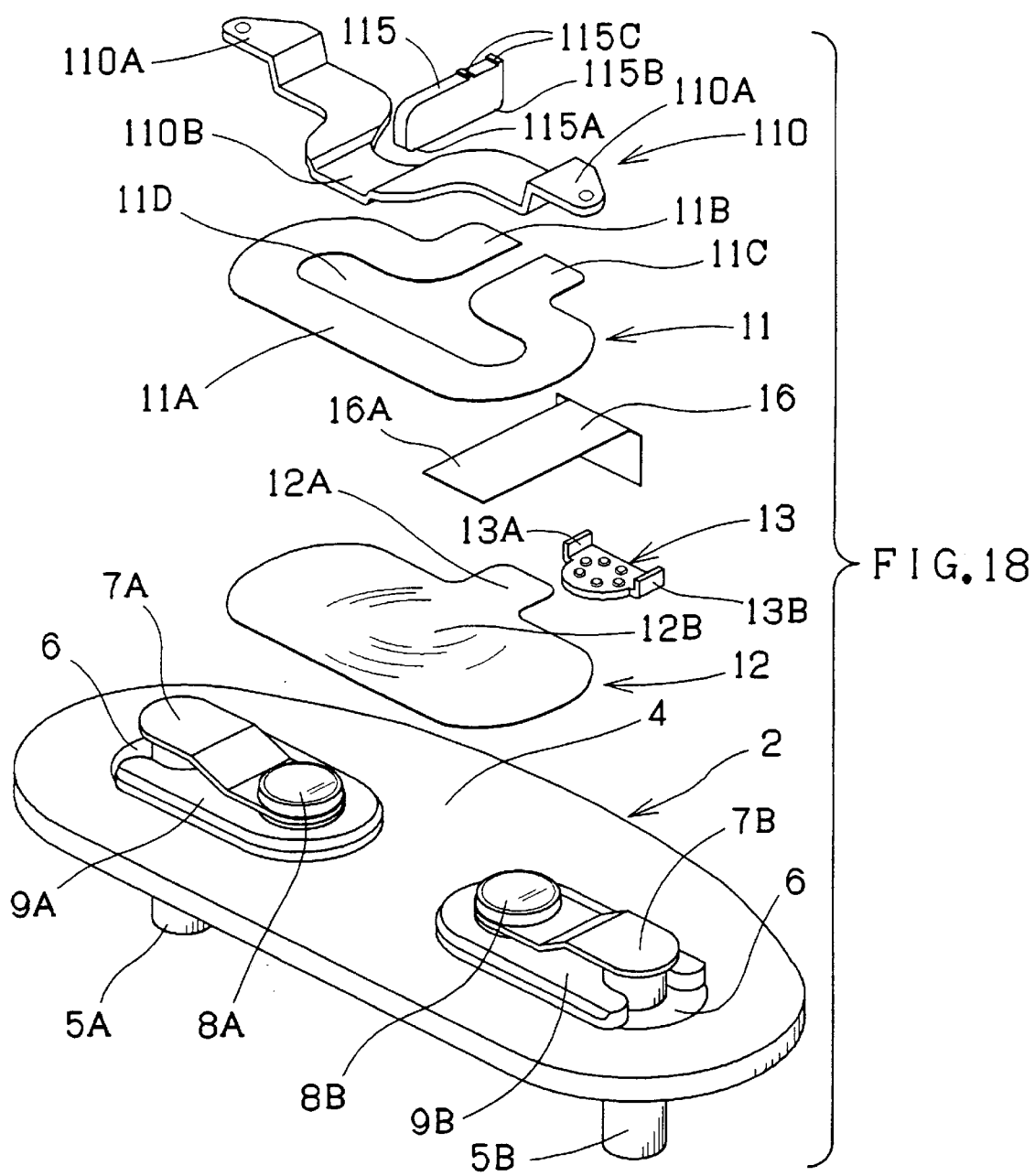
FIG. 18 is a view similar to FIG. 7, showing the thermal protector of a fourth embodiment in accordance with the present invention.

The necessity of insulation between the push piece 115 and the thermally responsive element 12 is higher when the resistance value of the thermally responsive element support 110 is rendered larger than the contact resistance at the distal end 115A of the push piece as in the fourth embodiment. As shown in FIGS. 15, 17 and 18, the thermally responsive element support 110 includes the middle portion 110B configured to detour the distal end 115A of the push piece 115 so that the current path via the thermally responsive element support 110 is prevented from being disturbed. Furthermore, the middle portion 110B is stepped so as to be prevented from the contact with the elastic plate 11. The thermally responsive element support 110 is made of a metal plate having a sufficient rigidity and is symmetrical about the middle portion 110B. The fixed portions 110A at both ends of the support 110 are welded to the inner surface of the housing 3 in the vicinity of ends of the latter to be sufficiently spaced from the calibrating portion 3B of the housing 3 and to hold all the parts at the movable contacts side.

Figure 16:
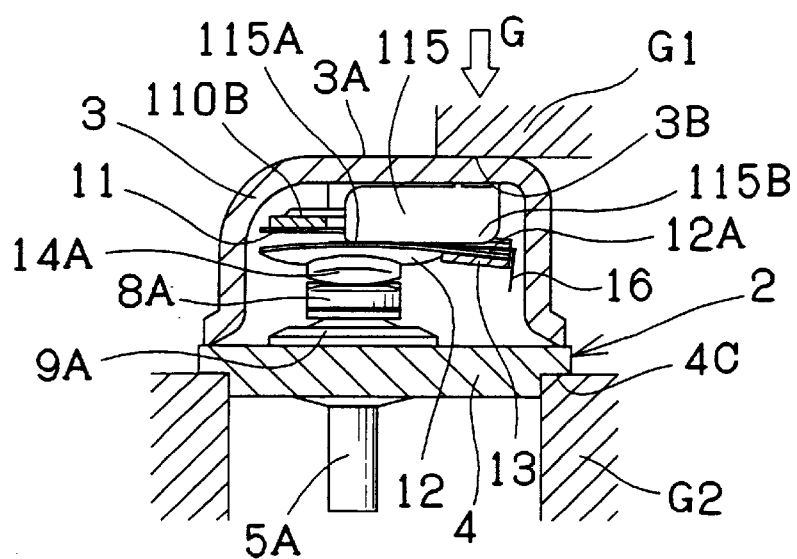
FIG. 16 is a view taken along line 16—16 in FIG. 15 with the temperature calibrating jigs as shown in FIG. 5 being applied to the thermal protector.

The insulating strip 16 is formed into a T-shape and one side 16A thereof is inserted into a space defined by the welded portions 13A and 13B of the securing piece 13 between the thermally responsive element 12 and the elastic plate 11 with the welded portions serving as respective support guides to be thereby positioned, as shown in FIG. 18. Furthermore, since the insulating strip 16 has an inserted end 16A and an opposite end having a larger width than the inserted end, it can be prevented from being inserted deeper than necessitated. Additionally, the thermally responsive element support 10 is secured to the housing 3 after insertion of the insulating strip 16 so that the wider end of the insulating strip is located between the thermally responsive element 12 etc. and the housing 3 as shown in FIG. 16. Consequently, the insulating strip can be prevented from being displaced into abutment against the housing 3 without any special falling-off preventing means. Thus, the insulating strip can be prevented from completely falling off.

It is preferable that the insulating strip 16 have such a degree of flexibility that it does not adversely affect the operation of the thermally responsive element 12 and the like even when brought into contact with the housing 3. The material for the insulating strip 16 preferably has a sufficient insulation performance, heat resisting property, strength and elasticity, for example, a polyamide sheet. The insulating strip 16 may be made of various heat resisting synthetic resins or ceramics if it is disposed so as not to prevent the operation of the thermally responsive element 12. The other construction of the thermal protector 301 is the same as that in the thermal protector 101 of the second embodiment.

According to the above-described thermal protector 301 of the fourth embodiment, the inserted end 16A of the insulating strip 16 is held between the thermally responsive element 12 and the push piece 115 to thereby insulate the thermally responsive element from the push piece. The push piece 11 5 is made of a metal and secured to the inner surface of the housing 3 at its welded portion 115C located diagonally with respect to its distal end 115A. Even in this construction, the phase current flowing through the protrusion 12A is caused to flow from the thermally responsive element 12 through the elastic plate 11 and the thermally responsive element support 110 without bypassing from the thermally responsive element 12 to the push piece 115. Accordingly, all of the phase current can be concerned in the heat generation of the thermally responsive element support 110. Consequently, heat thus generated by the thermally responsive element support 110 is transferred to the thermally responsive element 12 such that the increase in the temperature of the thermally responsive element 12 by the transferred heat can stably balanced with those due to the other phase currents flowing through the sides of the movable contacts 14A and 14B respectively. For example, when the thermal protector is used to protect an electric motor having a small rated current value, the resistance value of the thermally responsive element support serving as a heating element increasing an amount of heat in the protector can be increased without being limited by the bypass current so that the amount of heat can reliably be increased.

Figure 19:
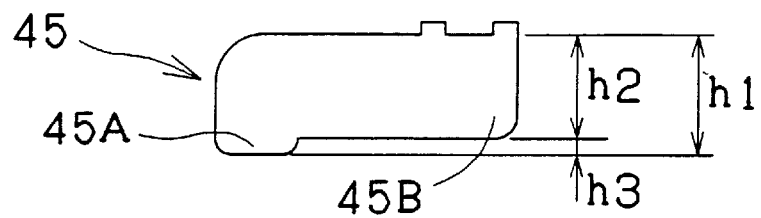
FIG. 19 is an enlarged view of the push piece employed in the thermal protector of the second embodiment.

The insulating strip 16 is interposed between the thermally responsive element 12 and the push piece 115 to insulate the thermally responsive element from the push piece 115 in the forth embodiment so that the increase in the temperature of the thermally responsive element 12 is balanced among the phase currents. The insulating means should not be limited to the above-described insulating strip 16. Modified forms of the insulating means will be described with reference to FIGS. 19 to 22. FIG. 19 illustrates an enlarged push piece 45 for the comparison with the following embodiments. Referring to FIG. 19, the push pieces 15, 115 and 215 in the first to third embodiments will be described. The push piece 45 is made of a metal and accordingly needs to be used with the insulating strip 16. Regarding the push piece 15 in the first embodiment, the difference h3 between the overall height h1 and the height h2 of the rear end is relatively large. In each of the second and third embodiments, the difference h3 is preferably set at or below one twentieth of the distance between the portion of the distal end of the push piece abutted against the thermally responsive element and the rear end of the push piece, as described above.

Figure 20:
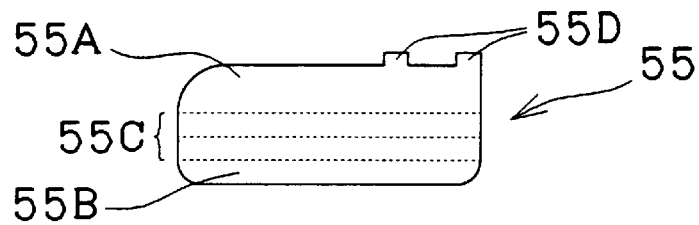
FIG. 20 is an enlarged view of the push piece employed in the thermal protector of a fifth embodiment in accordance with the present invention, which embodiment is a modified form of the fourth embodiment.

The elimination of the insulating strip 16 will be described. Referring to FIG. 20 showing a fifth embodiment, the push piece 55 is made of functional gradient materials further made by bonding two different types of materials together. The push piece 55 includes a metal base layer 55A having welded portions 55D welded to the housing 3 and an electrical insulator layer 55B abutted against the thermally responsive element and made of ceramics such as alumina. The push piece 55 further includes intermediate layers 55C having gradually varied mixture ratios of the ceramics and the metal. The current is not supplied across the upper and lower ends of the push piece 55 when it is secured to the housing 3 by the resistance welding. Accordingly, one of electrodes of a welding machine is connected to the metal layer 55A of the push piece 55 and the other electrode of the welding machine is connected to the housing 3 so that the welded portions 55D are secured to the housing 3.

The surface of the push piece 55 brought into contact with the thermally responsive element is made of the electrical insulator layer 55B. Accordingly, no bypass current flows even when the push piece 55 is directly brought into contact with the thermally responsive element. However, the insulator layer 55B need not be a complete insulator. The insulator layer 55B may have certain conductivity when it has such a large resistance value against the thermally responsive element that the bypass current can substantially be ignored.

Figure 21:
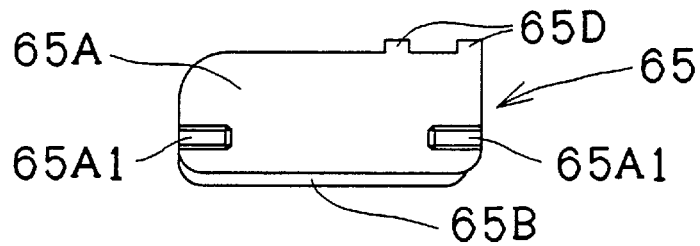
FIG. 21 is an enlarged view of the push piece employed in the thermal protector of a sixth embodiment in accordance with the present invention, which embodiment is another modified form of the fourth embodiment.
Figure 22:
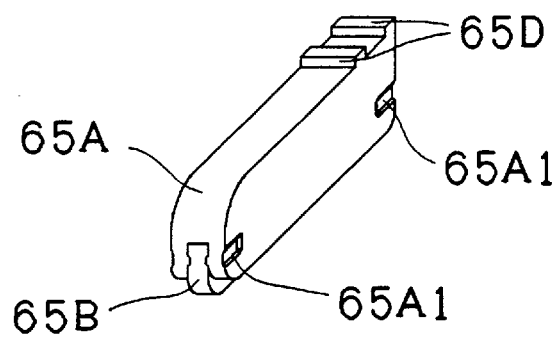
FIG. 22 is a perspective view of the push piece shown in FIG. 21.

FIGS. 21 and 22 illustrate a sixth embodiment of the invention. The push piece 65 includes a metal base 65A and an insulator 65B such as ceramics secured to the metal base by bonding or mechanical means. The base 65A has a groove formed in one end thereof to longitudinally extend. The insulator 65B is fitted in the groove in such a manner that a lower end portion thereof projects from the groove, as shown in FIGS. 21 and 22. Opposite end surfaces 65A1 of the base 65A are caulked so that the insulator 65B is mechanically secured so as not to fall off. The welded portions 65D of the metal base 65A of the push piece 65 are welded to the housing 3 and the insulator 65B of the push piece 65 is brought into contact with the thermally responsive element. Accordingly, no bypass current flows even when the push piece 65 is directly contacted with the thermally responsive element.

The electrical insulator in the second embodiment is preferably a non-conductive ceramic such as alumina. However, the insulator may be made of a conductive ceramic having a relatively large specific resistance value, for example, a ceramic of barium titanate system, or a non-oxidizing ceramic such as boron nitride (BN) or silicon carbide (SiC), instead. Furthermore, an engineering plastic may be used as the insulator when the operating temperatures of the thermally responsive element are relatively low. In this case, the metal base and the insulator can be formed integrally.

In the fifth and sixth embodiments, the push pieces 55 and 65 are used without provision of the insulating strips 16 in the same manner as in the second embodiment respectively. The bypass current flowing between the push piece and the thermally responsive element can substantially be ignored in each of the fifth and sixth embodiments as in the fourth embodiment wherein the insulating strip 16 is provided. Consequently, the increases in the temperature of the thermally responsive element due to the respective phase currents can easily be balanced.

Figure 23:
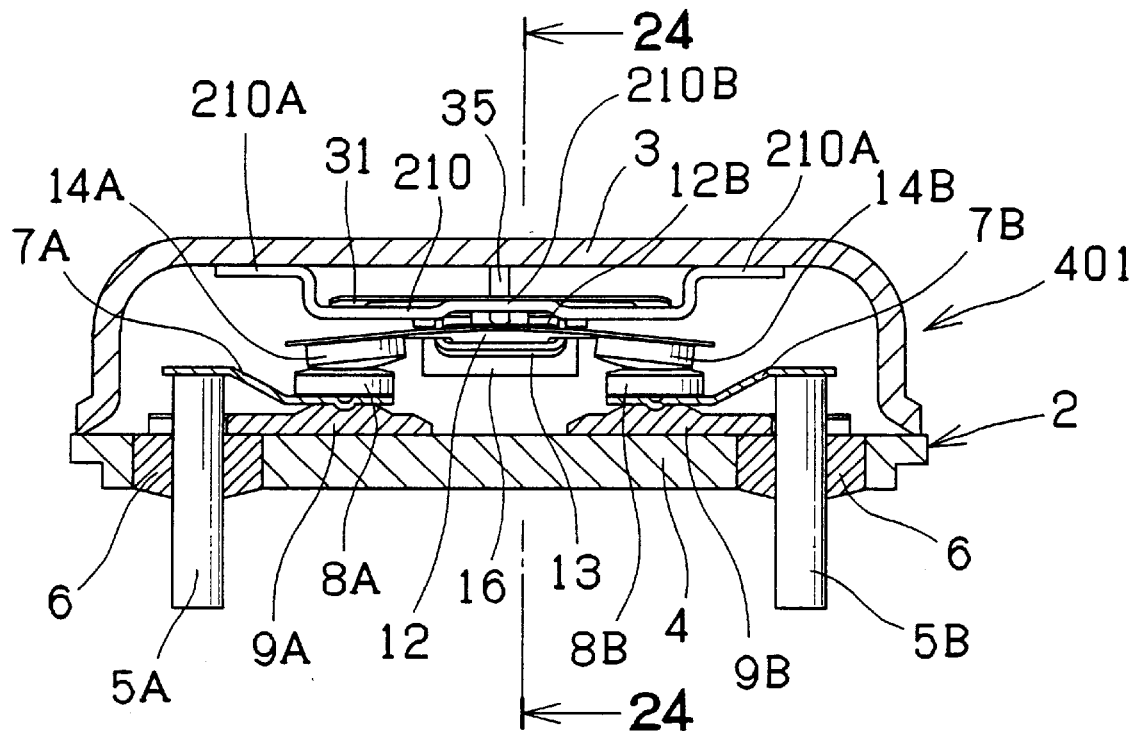
FIG. 23 is a longitudinal section of the thermal protector of a seventh embodiment in accordance with the present invention.
Figure 24:
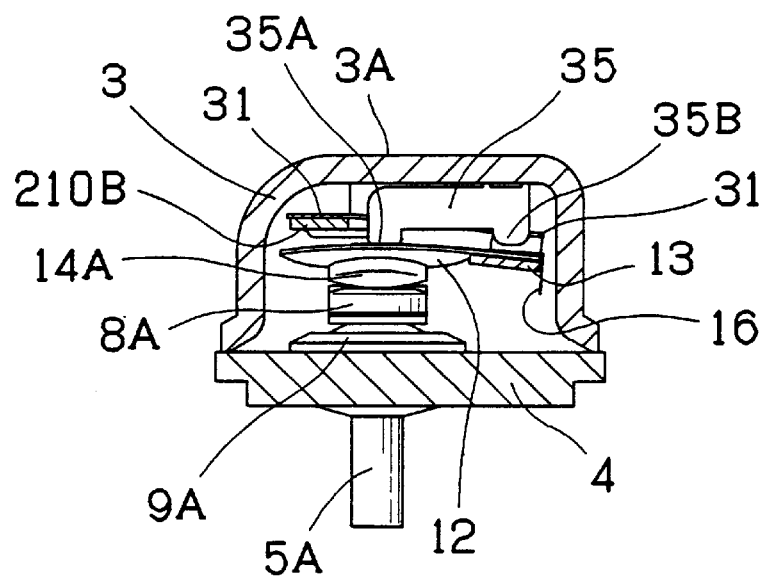
FIG. 24 is a view taken along line 24—24 in FIG. 23.
Figure 25:
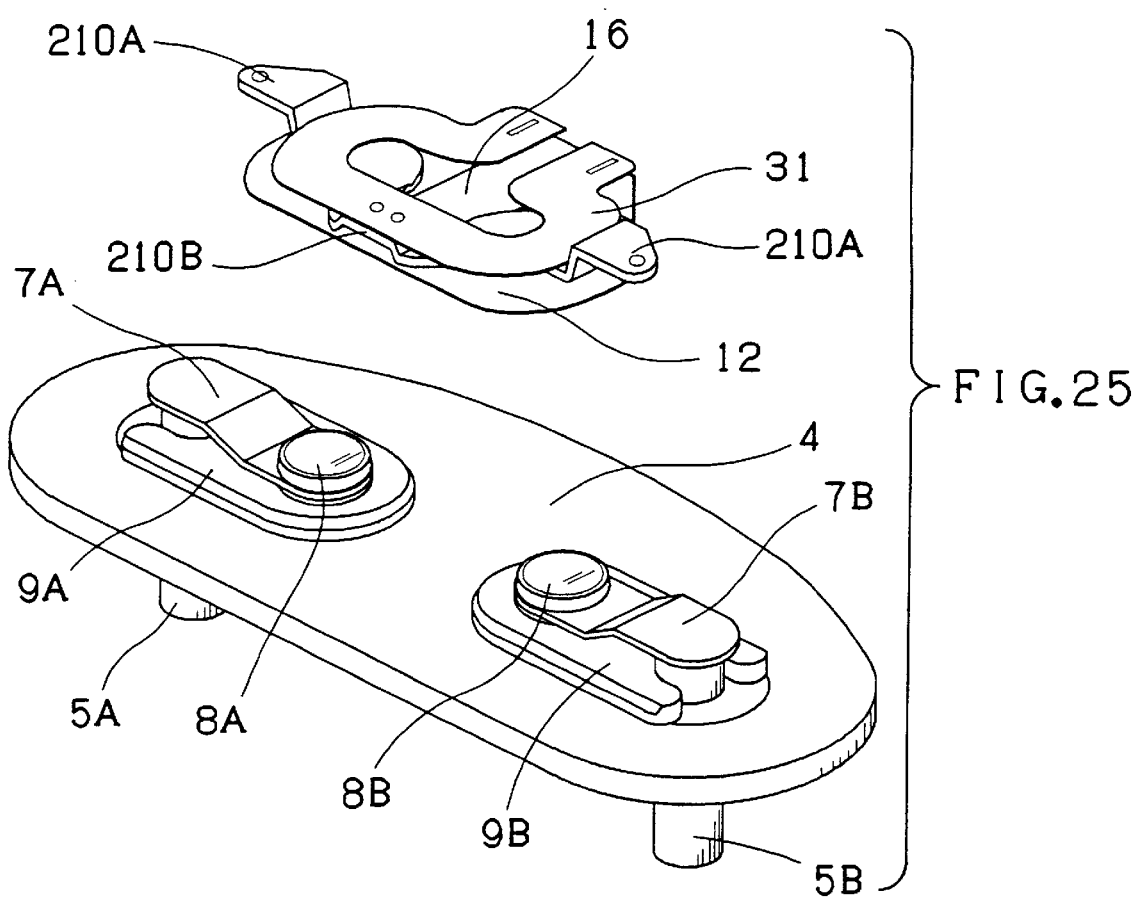
FIG. 25 is an exploded perspective view of the parts of the thermal protector of the seventh embodiment with the housing and the push piece being eliminated.

FIGS. 23 to 25 illustrate a seventh embodiment of the invention. The identical parts are labeled by the same reference symbols in the seventh embodiment as in the foregoing embodiments. In each of the first to fourth embodiments, the elastic plate 11 is disposed between the thermally responsive element 12 and the thermally responsive element support 10 to thereby partially cover both of them. In this construction, the efficiency of transfer of heat or radiant heat to the thermally responsive element sometimes becomes insufficient. The sectional area of the thermally responsive element support should be reduced so that the amount of heat generated by the element is increased. However, since the thermally responsive element support requires a certain strength, it is difficult to reduce its sectional area. Furthermore, it is considered that the thermally responsive element support should be made of another material. However, changing the material for the element has a limit in connection with weldability etc.

In the thermal protector 401 of the seventh embodiment, the elastic plate 31 is disposed between the thermally responsive element support 30 and the housing 3 so that the thermally responsive element support 30 directly faces the thermally responsive element 12, as shown in FIGS. 23 to 25.

The fixed portions 210A at the respective ends of the thermally responsive element support 210 are welded to the housing 3. The middle portion 210B of the thermally responsive element support 210 is configured to detour the push piece 35 and stepped so as to be prevented from the contact with the elastic plate 31. The middle portion 210B is convex toward the housing though the middle portion 110B in the fourth embodiment is convex toward the thermally responsive element. The elastic plate 31 has such a width as to be disposed between the fixed portions 210A of the thermally responsive element support 210. One end of the elastic plate 31 is welded to the middle portion 210B of the support 210 and the other end thereof is connected to the securing piece 13 further connected to the thermally responsive element 12.

The elastic plate 31 is configured to be disposed between the inner wall of the housing 3 and the thermally responsive element support 210 and to be connected to the thermally responsive element 12. Accordingly, the thermally responsive element support 210 serving as the heating element directly faces the thermally responsive element 12. As a result, the transfer of heat from the support 210 to the thermally responsive element 12 is enhanced. Thus, the increase in the temperature of the element 12 due to the phase current flowing through the elastic plate 31 can easily be balanced with those due to the other phase currents even when the resistance value of the support 210 and accordingly the amount of heat generated by the support 210 cannot easily be increased.

The push piece 35 has two protrusions 35A and 35B formed on the distal and rear ends thereof and abutted against the thermally responsive element 12. In the seventh embodiment, the insulating strip 16 is provided to insulate the thermally responsive element 12 from the push piece 35.

Each of the above-described thermal protectors is mounted on the end turns of the stator winding 61A of the motor 61 in the same manner as described above, as shown in FIGS. 26 and 27.

The increases in the temperature of the thermally responsive element due to the respective phase currents needs to be balanced when each of the above-described thermal protectors is used for protecting the three-phase motor having a Y-connected winding. In the prior art, the supported end of the thermally responsive element and the movable contacts are disposed on the three vertexes of an imaginary equilateral triangle. Accordingly, the conventional thermal protectors tend to be formed into a relatively flat configuration and to have approximately equal longitudinal and lateral dimensions. It is difficult to stably bind the conventional protectors on the end turns of the stator winding with strings and it is troublesome to cover the conventional protector with an insulating tube.

In the present invention, however, the imaginary lines between the supported portion of the thermally responsive element and the respective movable contacts are at an angle of about 90 degrees or more, so that the thermally responsive element is slender in the directions of the movable contacts. Consequently, the thermal protector can be rendered slender in its configuration. The increases in the temperature of the slender thermally responsive element due to the phase currents of the Y-connected windings are unbalanced. However, the thermally responsive element support or both of the thermally responsive element support and the fixed contact supports serve as the heating elements through which the respective phase currents flow so that heat is generated by the respective heating elements. The thermally responsive element is heated from its one side or both sides thereof so that an amount of heat generated by the thermally responsive element is compensated by the heat generated by the heating elements. Consequently, the increases in the temperature of the thermally responsive element due to the respective phase currents are balanced. Furthermore, the elastic plate supporting the thermally responsive element does not serve as the heating element such that the spring characteristic of the elastic plate can be prevented from being varied. Furthermore, when the insulating plates are provided for serving as the positioning members supporting the fixed contact supports respectively. Each of the insulating plates lets the heat due to heat during the contact disengagement escape to the header plate. Thus, each insulating plate enhances heat transfer.

Furthermore, the location of abutment of the distal end of the push piece is shifted toward the connection at which the thermally responsive element is connected to the elastic plate, relative to the middle point between the movable contacts. With this, the connection side of the push piece is adjacent to the thermally responsive element to limit the displacement of the element due to bending back thereof during its reversing operation. The reaction displaces the movable contact side of the thermally responsive element such that the occurrence of tack weld of the contact is restricted. Furthermore, when the thermal protector is used to protect an electric motor having a small rated current value, the insulator such as the insulating strip is provided or the push piece is insulated for preventing the current from bypassing from the thermally responsive element to the push piece so that the resistance value of the thermally responsive element support can readily be increased. In order that heat generated by the thermally responsive element support acts on the thermally responsive element directly and effectively, the elastic plate is configured and disposed so that the thermally responsive element support directly faces the thermally responsive element. As the result of the above-described construction, the increases in the temperature of the thermally responsive element due to the phase currents can readily be balanced. Consequently, the slender thermally responsive element such as used in the thermal protector for the single-phase motors can be used in the thermal protector for the three-phase motors. Additionally, the slender thermal protector of the invention can readily be mounted on the end turns of the motor winding. The housing is expanded at the side of the connection between the thermally responsive element and the elastic plate. The configuration of the housing is matched with the arc of the end turns of the motor winding. Thus the thermal protector of the invention can readily be used as an internal protector directly mounted on the motor.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A thermal protector comprising:
    a header plate having two through holes which is formed in the vicinity of longitudinal ends thereof respectively and in which two electrically conductive terminal pins are hermetically fixed by an electrically insulating filler so as to extend therethrough respectively;
    a metal housing having an open end hermetically welded to an peripheral edge of the header plate to thereby constitute a hermetic receptacle with the header plate, the housing being formed into a generally slender shape so as to be suited for mounting on end turns of a winding of an electric motor, the housing including an outer surface portion deformed for calibration of an operating temperature;
    two fixed contacts conductively secured to fixed contact supports further conductively secured to ends of the terminal pins located in the hermetic receptacle respectively;
    a metal thermally responsive element support secured to the inner surface of the housing at two longitudinally spaced apart portions thereof;
    an elastic plate electrically conductively and mechanically connected at one side thereof to a generally central portion of the thermally responsive element support;
    a thermally responsive element electrically conductively and mechanically connected to the other side of the elastic plate and including a generally shallow curved portion at which the element changes states of curvature with snap action in response to different ambient temperatures, the thermally responsive element having two movable contacts secured thereto to be disposed approximately symmetrically about a center of the curved portion so that the movable contacts are engageable with and disengageable from the fixed contacts respectively;
    a push piece disposed in the housing to exert a pushing force on a normally convex side of the thermally responsive element, the pushing force being adjusted by deforming the outer surface portion of the housing for calibration of the operating temperature, the push piece including a portion secured to an inner surface of the housing so as to correspond substantially to the deformed outer surface portion of the housing for calibration of the operating temperature.

2. A thermal protector according to claim 1, wherein the push piece is abutted against a portion of the thermally responsive element in the vicinity of the center of the curved portion on the normally convex side thereof and is further adjacent to another portion of the thermally responsive element at or in the vicinity of which the thermally responsive element is connected to the elastic plate.

3. A thermal protector according to claim 1, wherein imaginary lines between a connection between the thermally responsive element and the elastic plate and the respective movable contacts are at an angle of at least about 90 degrees and the connection and the movable contacts form a substantial isosceles triangle.

4. A thermal protector according to claim 2, wherein imaginary lines between a connection between the thermally responsive element and the elastic plate and the respective movable contacts are at an angle of at least about 90 degrees and the connection and the movable contacts form a substantial isosceles triangle.

5. A thermal protector according to claim 3, wherein each of the thermally responsive element support and the fixed contact support heats up when current flows therethrough, thereby heating the thermally responsive element.

6. A thermal protector according to claim 4, wherein each of the thermally responsive element support and the fixed contact support heats up when current flows therethrough, thereby heating the thermally responsive element.

7. A thermal protector according to claim 1, wherein a location of abutment of the push piece on the thermally responsive element is shifted by a predetermined distance toward an end of the thermally responsive element at which the same is connected to the elastic plate, relative to the center of the curved portion.

8. A thermal protector according to claim 2, wherein a location of abutment of the push piece on the thermally responsive element is shifted by a predetermined distance toward an end of the thermally responsive element at which the same is connected to the elastic plate, relative to the center of the curved portion.

9. A thermal protector according to claim 1, further comprising positioning members disposed between the header plate and the respective fixed contact supports to define a distance therebetween.

10. A thermal protector according to claim 2, further comprising positioning members disposed between the header plate and the respective fixed contact supports to define a distance therebetween.

11. A thermal protector according to claim 9, wherein each positioning member is made of an electrically resistive heating material.

12. A thermal protector according to claim 10, wherein each positioning member is made of an electrically resistive heating material.

13. A thermal protector according to claim 9, wherein the positioning members are elastically held between the fixed contact supports and the header plate respectively.

14. A thermal protector according to claim 10, wherein the positioning members are elastically held between the fixed contact supports and the header plate respectively.

15. A thermal protector according to claim 1, further comprising an electrical insulator or an electrically resistive material interposed between the push piece and the thermally responsive element to restrain a bypass current flowing therebetween.

16. A thermal protector according to claim 2, further comprising an electrical insulator or an electrically resistive material interposed between the push piece and the thermally responsive element to restrain a bypass current flowing therebetween.

17. A thermal protector according to claim 1, wherein the push piece comprises a metal member and an electrically insulating material or resistive material integrated with the metal member.

18. A thermal protector according to claim 2, wherein the push piece comprises a metal member and an electrically insulating material or resistive material integrated with the metal member.

19. A thermal protector according to claim 1, wherein the elastic plate is disposed between the thermally responsive element and the thermally responsive element support so that the elastic plate, the thermally responsive element and the thermally responsive element are substantially parallel with one another, and the elastic plate has an opening through which a partial surface of the thermally responsive element directly receives a radiant heat from the thermally responsive element support.

20. A thermal protector according to claim 2, wherein the elastic plate is disposed between the thermally responsive element and the thermally responsive element support so that the elastic plate, the thermally responsive element and the thermally responsive element are substantially parallel with one another, and the elastic plate has an opening through which a partial surface of the thermally responsive element directly receives a radiant heat from the thermally responsive element support.

21. A thermal protector according to claim 1, wherein the thermally responsive element, the elastic plate and the thermally responsive element support are disposed substantially in parallel with one another, and the elastic plate is disposed at a side of the thermally responsive element support opposed to a side thereof facing the thermally responsive element so that a radiant heat from the thermally responsive element support reaches the thermally responsive element without being intercepted.

22. A thermal protector according to claim 2, wherein the thermally responsive element, the elastic plate and the thermally responsive element support are disposed substantially in parallel with one another, and the elastic plate is disposed at a side of the thermally responsive element support opposed to a side thereof facing the thermally responsive element so that a radiant heat from the thermally responsive element support reaches the thermally responsive element without being intercepted.

* * * * *